(12) United States Patent
Yanai et al.

(10) Patent No.: US 8,427,758 B2
(45) Date of Patent: Apr. 23, 2013

(54) ZOOM LENS AND IMAGE PICKUP APPARATUS USING THE SAME

(75) Inventors: Tetsuya Yanai, Kodaira (JP); Mayu Miki, Musashino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/435,425

(22) Filed: Mar. 30, 2012

(65) Prior Publication Data

US 2012/0250161 A1 Oct. 4, 2012

(30) Foreign Application Priority Data

Mar. 30, 2011 (JP) .................................. 2011-074865

(51) Int. Cl.
*G02B 15/14* (2006.01)
*G02B 3/02* (2006.01)

(52) U.S. Cl.
USPC ............................. 359/686; 359/683; 359/715

(58) Field of Classification Search .................. 359/680, 359/683, 686, 715

See application file for complete search history.

(56) References Cited

U.S. PATENT DOCUMENTS

| 6,320,698 B1 * | 11/2001 | Suzuki | 359/557 |
| 6,710,931 B1 * | 3/2004 | Misaka | 359/686 |
| 7,974,017 B2 | 7/2011 | Katakura | |

FOREIGN PATENT DOCUMENTS

| JP | 2003-131130 | 5/2003 |
| JP | 2010-054722 | 3/2010 |

\* cited by examiner

*Primary Examiner* — Jack Dinh
(74) *Attorney, Agent, or Firm* — Kenyon & Kenyon LLP

(57) ABSTRACT

A zoom lens comprises in order from an object side, a first lens unit having a negative refractive power, a second lens unit having a positive refractive power, a third lens unit having a negative refractive power, and a fourth lens unit having a negative refractive power. The second lens unit comprises in order from the object side, a positive lens, a negative lens, and a positive lens. At the time of zooming from a wide angle end to a telephoto end, the first lens unit moves toward the object side, and the fourth lens unit moves, and a distance between the first lens unit and the second lens unit decreases monotonically, a distance between the second lens unit and the third lens unit increases monotonically, and a distance between the third lens unit and the fourth lens unit increases monotonically.

22 Claims, 18 Drawing Sheets

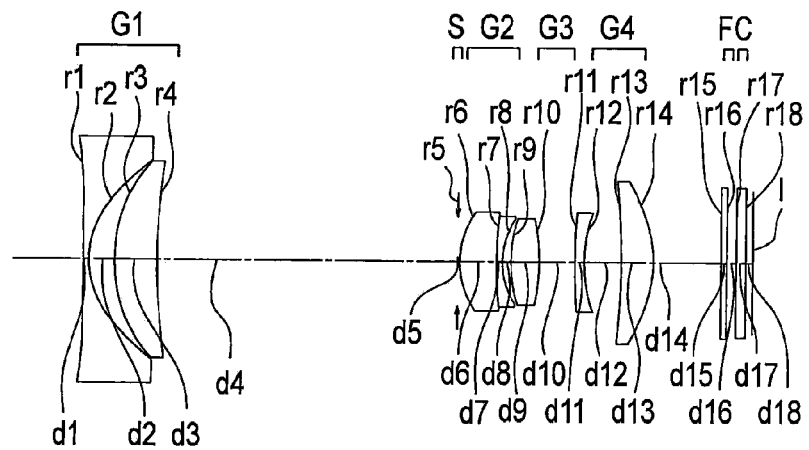
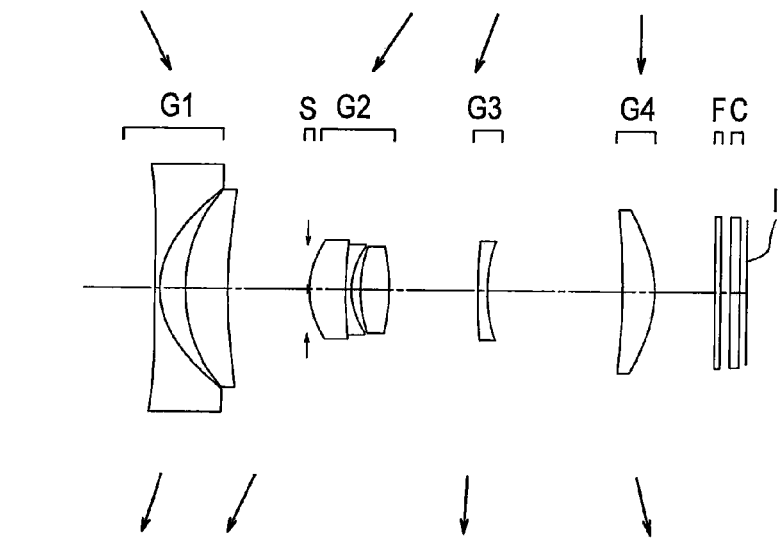
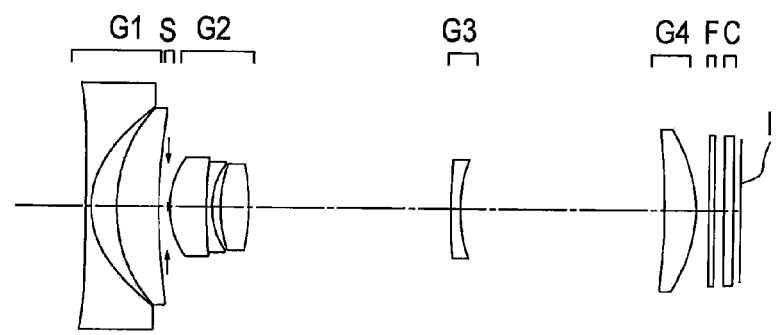

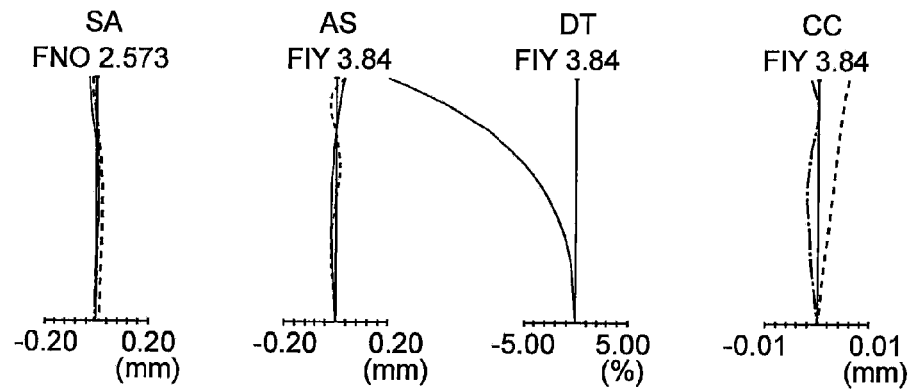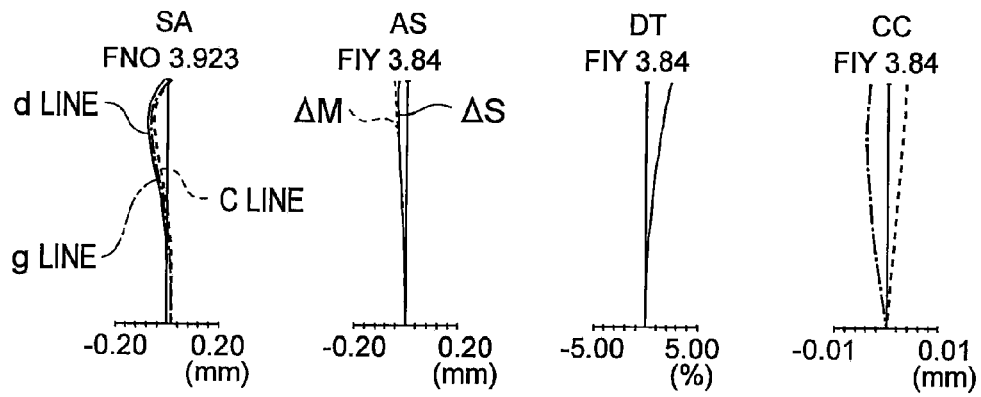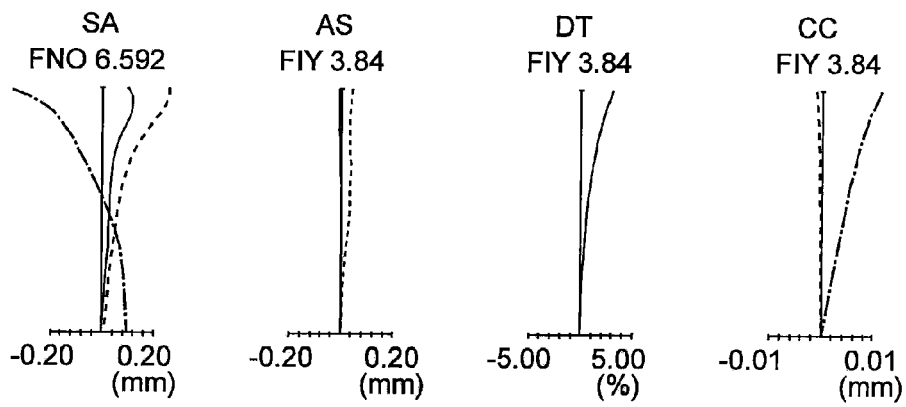

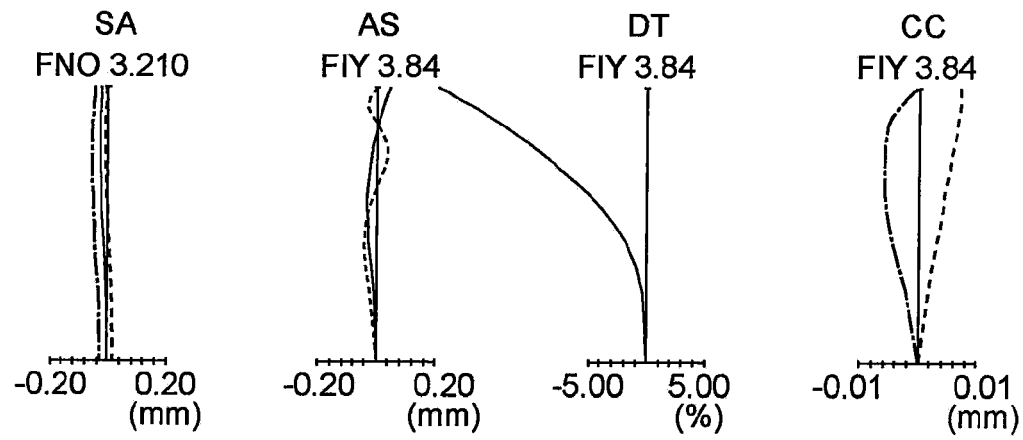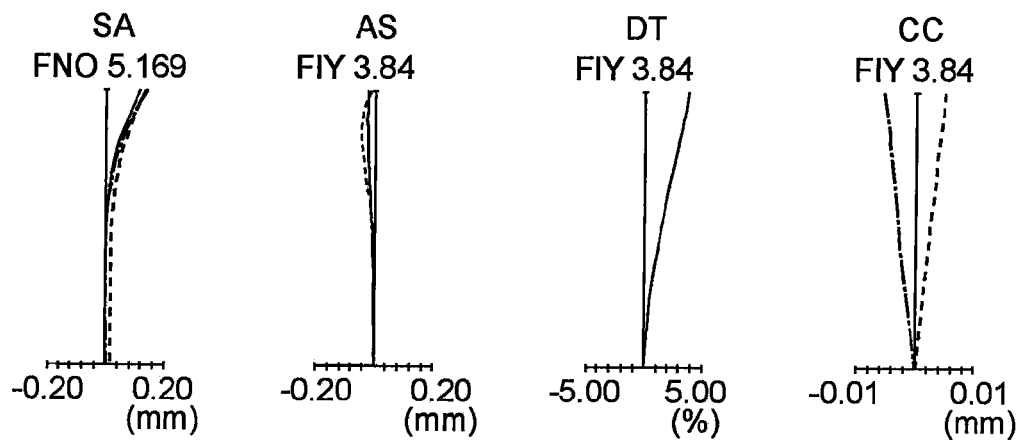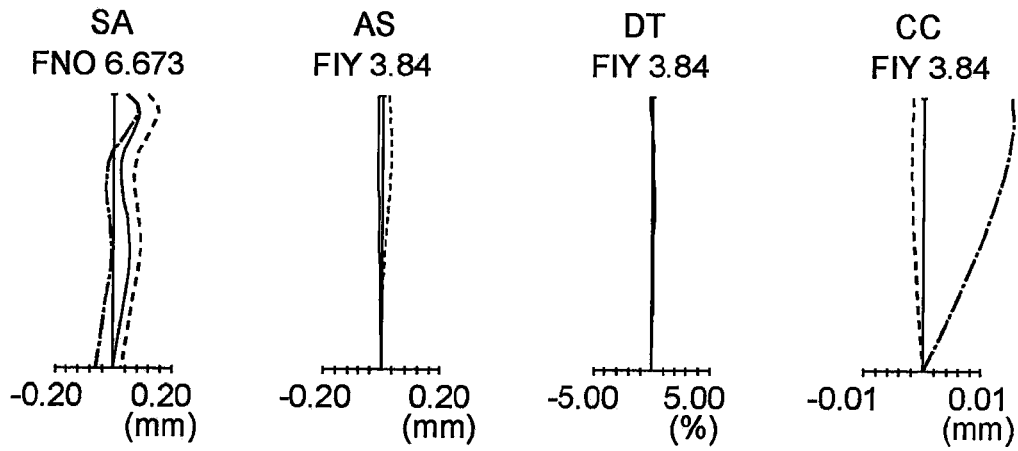

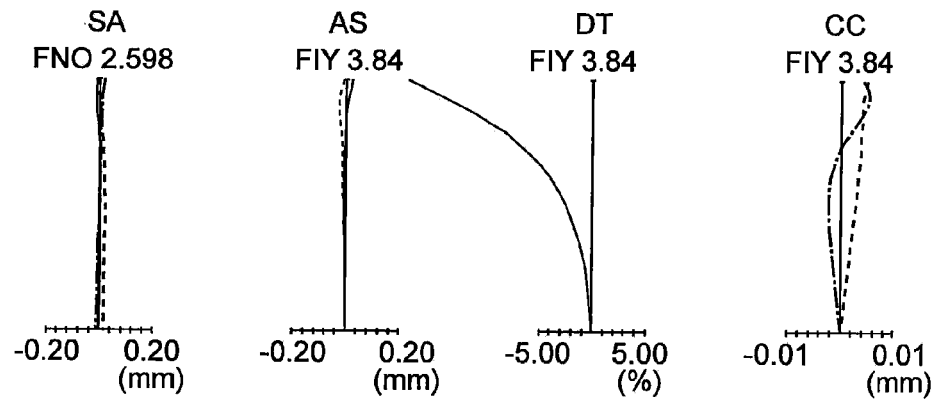
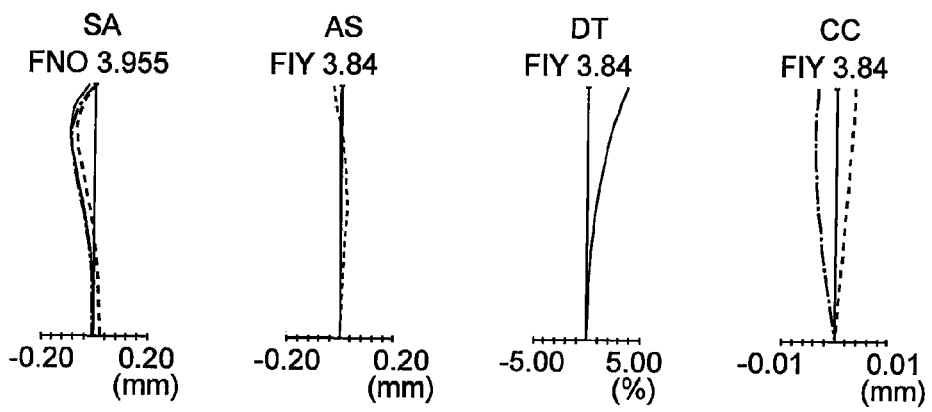
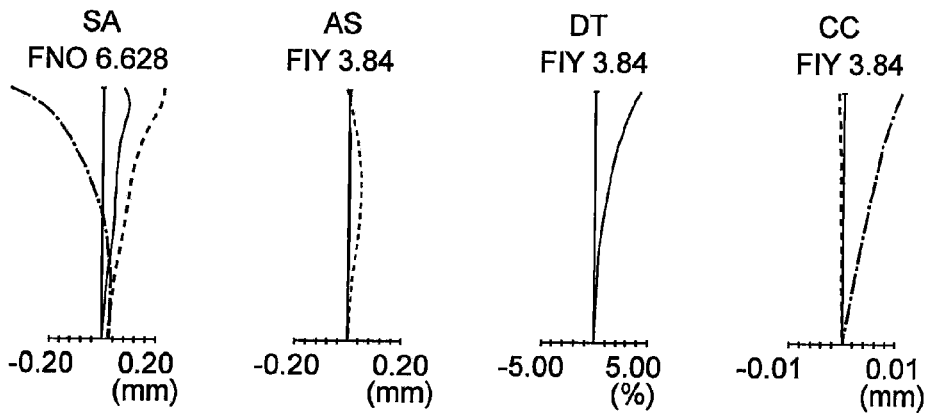

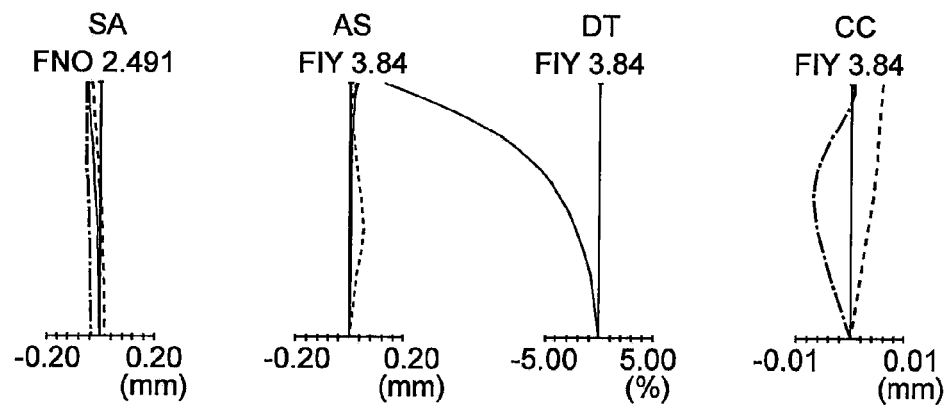
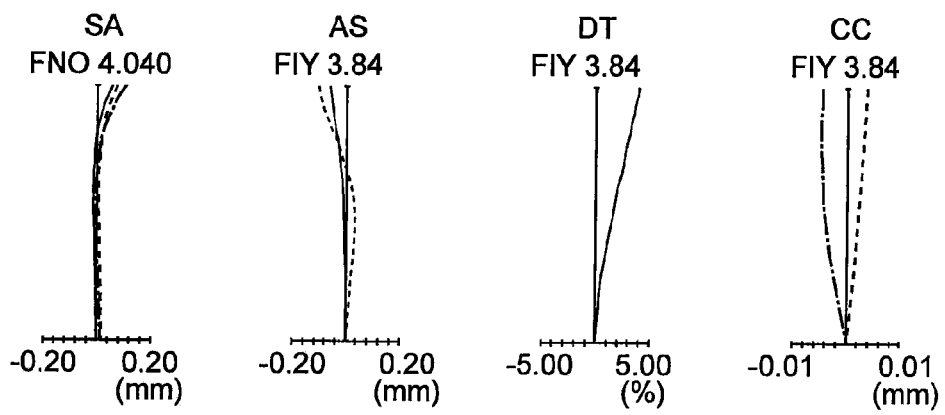
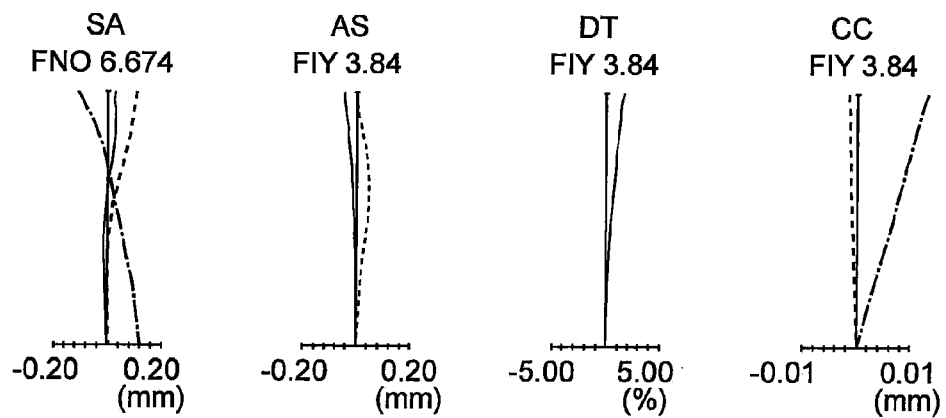

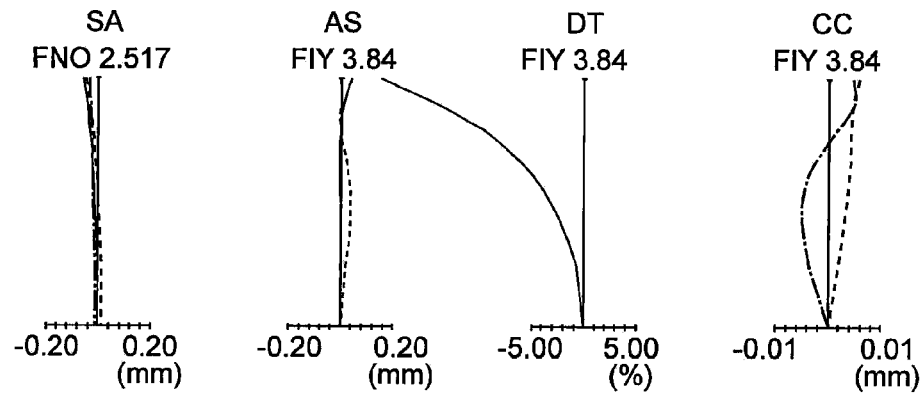
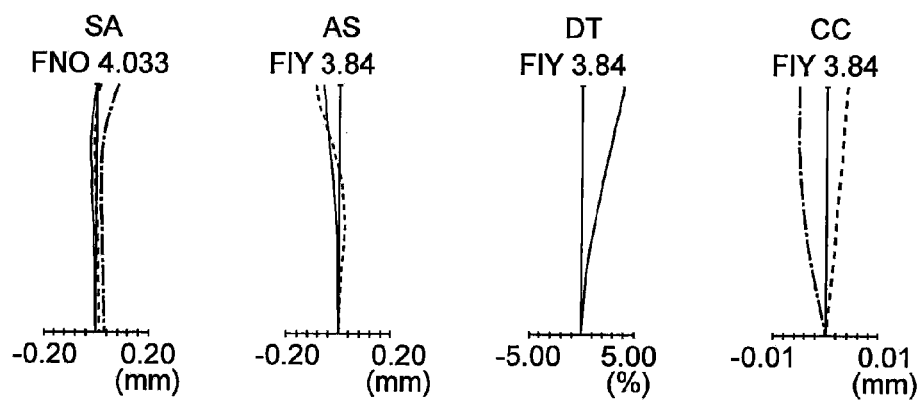
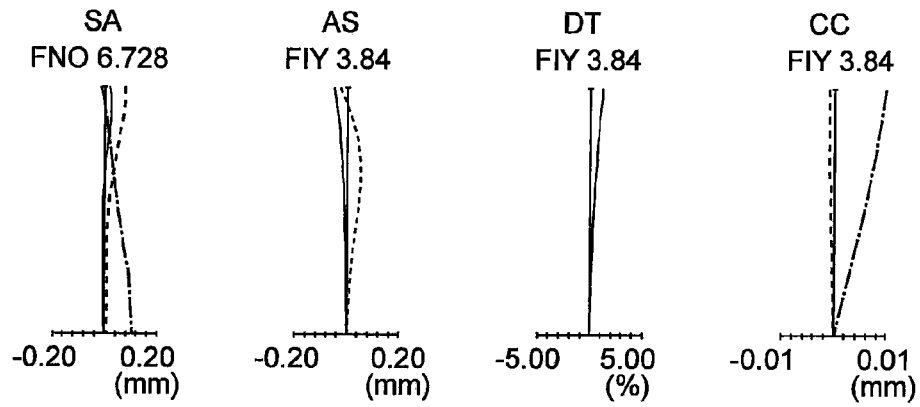

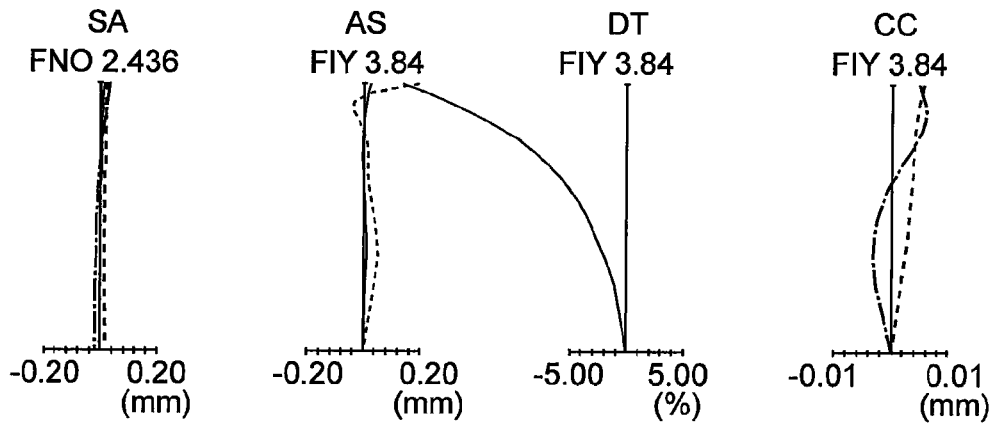
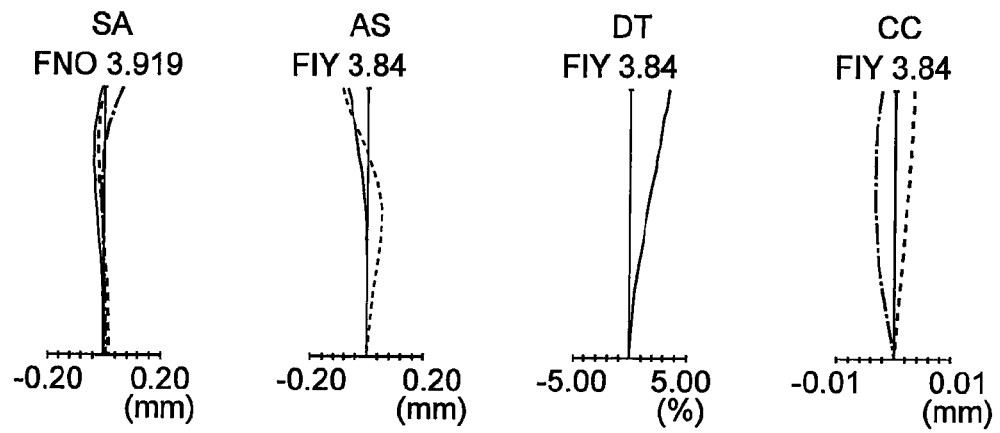
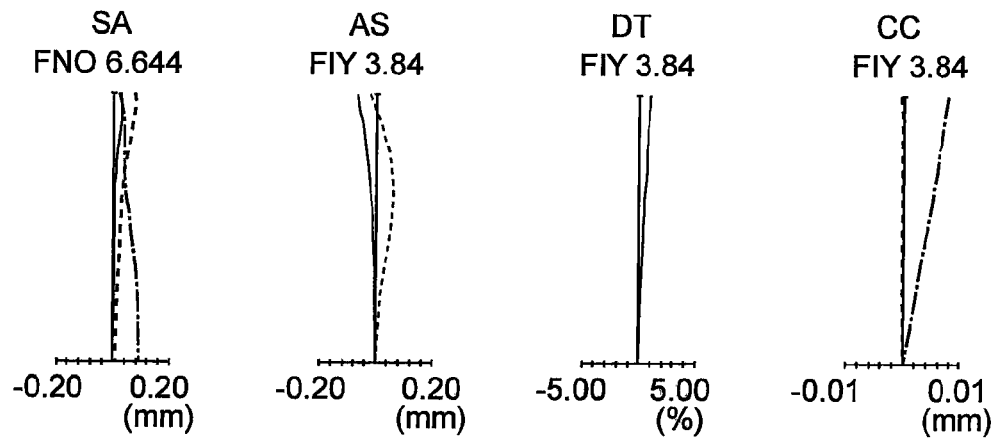

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2011-074865 filed on Mar. 30, 2011; the entire contents of which are incorporated herein by reference.

BACKGROUND OF THE INVENTION

1. Field of the Invention

The present invention relates to a zoom lens, and an image pickup apparatus using the same.

2. Description of the Related Art

In recent years, instead of a silver-salt film camera, a digital camera in which, an object is photographed by using an image pickup element such as a CCD (Charge Coupled Device) or a CMOS (Complementary Metal Oxide Semiconductor) has become a mainstream. Furthermore, there are several categories of digital cameras in a wide range from a high-function type for professional use to a compact popular and widely-used type.

From among the digital cameras in the wide range, with the popular and widely-used type digital camera, a user seeks to enjoy photography readily, anywhere at any time with a wide range of scenes. Particularly, since a slim digital camera can be accommodated easily in a pocket of clothes or a bag, and can be carried conveniently, such digital camera has been preferred. Due to this, further small-sizing of an image pickup lens system has been sought.

Moreover, with regard to a capture area, user seeks to capture a wide area. Therefore, a taking lens system having a wide angle of field characteristic such as a taking lens system with a wide angle of field, where the an angle of field at diagonally opposing corners is more than 70° has been sought. Moreover, with regard to a zooming ratio, an image pickup lens system having the zooming ratio of more than five times has been sought.

As a zoom lens having a comparatively wide angle of view, a zoom lens which includes in order from an object side, a first lens unit having a negative refractive power, a second lens unit having a positive refractive power, a third lens unit having a negative refractive power, and a fourth lens unit having a positive refractive power has been known (Japanese Patent Application Laid-open Publication No. 2010-54722 and Japanese Patent Application Laid-open Publication No. 2003-131130).

A zoom lens disclosed in Japanese Patent Application Laid-open Publication No. 2010-54722 is a zoom lens having the zooming ratio of five times. In this zoom lens, a second lens unit includes three lenses in order from an object side, namely, a positive lens, a positive lens, and a negative lens. Whereas, a zoom lens disclosed in Japanese Patent Application Laid-open Publication No. 2003-131130 is a zoom lens having the zooming ratio of three times. In this zoom lens, a second lens unit includes three lenses in order from an object side, namely, a positive lens, a negative lens, and a positive lens.

SUMMARY OF THE INVENTION

A zoom lens according to a first aspect of the present invention comprises in order from an object side
a first lens unit having a negative refractive power,
a second lens unit having a positive refractive power,
a third lens unit having a negative refractive power, and
a fourth lens unit having a positive refractive power, and
the second lens unit comprises in order from the object side
a positive lens element,
a negative lens element, and
a positive lens element, and
at the time of zooming from a wide angle end to a telephoto end,
the third lens unit moves toward the object side, and the fourth lens unit moves, and
a distance between the first lens unit and the second lens unit decreases monotonically, and
a distance between the second lens unit and the third lens unit increases monotonically, and
a distance between the third lens unit and the fourth lens unit increases monotonically.

A zoom lens according to a second aspect of the present invention comprises in order from an object side
a first lens unit having a negative refractive power,
a second lens unit having a positive refractive power,
a third lens unit having a negative refractive power, and
a fourth lens unit having a positive refractive power, and
the second lens unit comprises in order from the object side
a positive lens element,
a negative lens element, and
a positive lens element, and
the zoom lens satisfies the following conditional expression (1)

$$ft/fw \geq 5 \qquad (1)$$

where,
ft denotes a focal length of the overall zoom lens system at a telephoto end, and
fw denotes a focal length of the overall zoom lens system at a wide angle end.

An image pickup apparatus according to a third aspect of the present invention comprises
the zoom lens, and
an image pickup element which includes an image pickup surface which converts an optical image to an electric signal.

BRIEF DESCRIPTION OF THE DRAWINGS

FIG. 1A shows a state at a wide angle end, FIG. 1B shows an intermediate focal length state, and FIG. 1C shows a state at a telephoto end;

FIG. 4A, FIG. 4B, and FIG. 4C are diagrams similar to FIG. 1A, FIG. 1B, and FIG. 1C respectively, of a fourth embodiment of the zoom lens according to the present invention;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of infinite object point focusing of the first embodiment;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the second embodiment;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing of the third embodiment;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the fourth embodiment;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing of the fifth embodiment;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the sixth embodiment;

DETAILED DESCRIPTION OF THE PREFERRED EMBODIMENTS

Figure 1A:
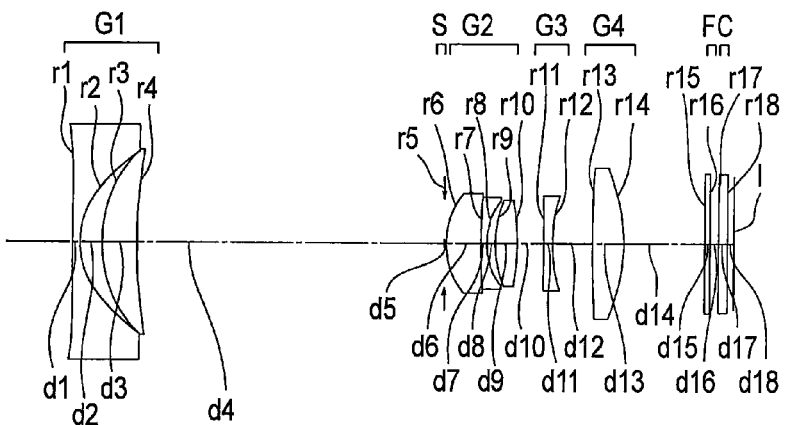
FIG. 1A, FIG. 1B, and FIG. 1C are cross-sectional views at a time of infinite object point focusing according to a first embodiment of a zoom lens according to the present invention, where.

A first zoom lens according to the present invention comprises in order from an object side a first lens unit having a negative refractive power,
a second lens unit having a positive refractive power,
a third lens unit having a negative refractive power, and
a fourth lens unit having a positive refractive power, and
the second lens unit comprises three lenses in order from the object side namely,
a positive lens,
a negative lens, and
a positive lens, and
at the time of zooming from a wide angle end to a telephoto end
the third lens unit moves toward the object side, and the fourth lens unit moves, and
a distance between the first lens unit and the second lens unit decreases, and
a distance between the second lens unit and the third lens unit increases, and
a distance between the third lens unit and the fourth lens unit increases.

In the first zoom lens according to the present invention (hereinafter, called as 'first zoom lens'), a structure which comprises the first lens unit having a negative refractive power, the second lens unit having a positive refractive power, the third lens unit having a negative refractive power, and the fourth lens unit having a positive refractive power is adopted. By disposing a negative lens unit nearest to the object side and a positive lens unit nearest to an image side, an optical system assumes a structure of retro focus. Therefore, it is possible to realize a zoom lens with a wide angle of view, in which, back focus of certain degree is achieved.

Moreover, in the first zoom lens, the second lens unit includes three lenses, which are arranged in order from the object side, the positive lens, the negative lens, and the positive lens. By adopting such an arrangement, it is possible to suppress an overall length of the second lens unit as compared to a case in which, in the lens arrangement of the second lens unit, the three lenses are disposed in order of the positive lens, the positive lens, and the negative lens, in an optical axial direction. Moreover, by arranging the lenses in order of the positive lens, the negative lens, and the positive lens in the second lens unit, it is possible to increase (make stronger) the positive refractive power of the second lens unit while increasing (making stronger) the negative refractive power of the third lens unit. Therefore, it is possible to suppress an amount of movement of the second lens unit. Accordingly, it is possible to form a compact zoom lens of which, an overall length is short.

Moreover, in the first zoom lens, an arrangement is made such that, at the time of zooming from the wide angle end to the telephoto end, each lens unit moves in a direction advantageous for zooming such that the distance between the first lens unit and the second lens unit decreases, the distance between the second lens unit and the third lens unit increases, and the distance between the third lens unit and the fourth lens unit increases.

By changing the distance between the second lens unit and the third lens unit increases, it is possible to suppress a disadvantageous effect of various aberrations such as a spherical aberration due to decentering of the second lens unit and the third lens unit, and to secure aberration performance.

Moreover, at the time of zooming from the wide angle end to the telephoto end, while imparting a zoom effect in the third lens unit by moving the third lens unit toward the object side, and the zoom effect is imparted also to the fourth lens unit by moving the fourth lens unit with increasing the distance between the third lens unit and the fourth lens unit. Accordingly, since it is possible to suppress an amount of movement of the second lens unit and the third lens unit, it is possible to form a compact structure in which the overall length of the zoom lens is suppressed while achieving high zooming ratio, and also it is possible to suppress a fluctuation (change) in various aberrations.

Moreover, a second zoom lens according to the present invention comprises in order from an object side a first lens unit having a negative refractive power, a second lens unit having a positive refractive power, a third lens unit having a negative refractive power, and a fourth lens unit having a positive refractive power, and the second lens unit comprises three lenses in order from the object side, namely, a positive lens, a negative lens, and a positive lens, and the zoom lens satisfies the following conditional expression (1).

$$ft/fw \geq 5 \tag{1}$$

where, ft denotes a focal length of the overall zoom lens system at a telephoto end, and fw denotes a focal length of the overall zoom lens system at a wide angle end.

An action and an effect of the refractive power of the lens units from the first lens unit to the fourth lens unit, and the lens arrangement of the second lens unit are same as in the first zoom lens.

Conditional expression (1) is a conditional expression which regulates the zooming ratio. By satisfying conditional expression (1), it is possible to realize a zoom lens having a high zooming ratio while having a compact structure.

Moreover, it is desirable that the first zoom lens and the second zoom lens (hereinafter, 'the zoom lens') according to the present invention satisfy the following conditional expression (2).

$$0.33 \leq \Delta 2G(w-t)/dt \leq 0.6 \quad (2)$$

where, $\Delta 2G(w-t)$ denotes an amount of movement of the second lens unit when zoomed from the wide angle end to the telephoto end, and dt denotes an overall length of the zoom lens at the telephoto end.

Conditional expression (2) is a conditional expression which regulates the amount of movement of the second lens unit at the time of zooming, and standardizes the amount of movement of the second lens unit from the wide angle end to the telephoto end by the overall length at the zoom lens telephoto end. By satisfying conditional expression (2), it is possible to realize a zoom lens having a high zooming ratio while adopting a compact structure.

When an upper limit of conditional expression (2) is surpassed, the amount of movement of the second lens unit increases. In this case, since the overall length of the zoom lens becomes longer, it becomes difficult to let the zoom lens have a compact structure. When a lower limit of conditional expression (2) is not reached since the amount of movement of the second lens unit decreases, a zooming effect of the second lens unit becomes small. As a result, it is not possible to achieve a high zooming ratio.

Moreover, it is desirable that the zoom lens satisfies the following conditional expression (3).

$$0 < \Delta 3G(w-t)/\Delta 2G(w-t) \leq 0.7 \quad (3)$$

where, $\Delta 2G(w-t)$ denotes the amount of movement of the second lens unit when zoomed from the wide angle end to the telephoto end, and $\Delta 3G(w-t)$ denotes an amount of movement of the third lens unit when zoomed from the wide angle end to the telephoto end.

Conditional expression (3) is a conditional expression which regulates the amount of movement of the third lens unit from the wide angle end to the telephoto end, and the amount of movement of the second lens unit from the wide angle end to the telephoto end. By satisfying conditional expression (3), it is possible to achieve a high zooming ratio upon suppressing a fluctuation of (change in) a chromatic aberration at the time of zooming.

When an upper limit of conditional expression (3) is surpassed, since the amount of movement of the third lens unit increases with respect to the amount of movement of the second lens unit, the fluctuation of (change in) the chromatic aberration at the time of zooming increases. Moreover, since the third lens unit comes closer to the second lens unit, a disadvantageous effect due to decentering of the second lens unit and the third lens unit becomes large, and it becomes difficult to secure aberration performance. When a lower limit of conditional expression (3) is not reached, since the amount of movement of the third lens unit decreases with respect to the amount of movement of the second lens unit, the zooming effect in (by) the third lens unit becomes small.

Moreover, it is desirable that the zoom lens satisfies the following conditional expression (4).

$$0.1 \leq |\phi_3/\phi_4| \leq 1.5 \quad (4)$$

where, $\phi_3$ denotes a refractive power of the third lens unit, and $\phi_4$ denotes a refractive power of the fourth lens unit.

Conditional expression (4) is a conditional expression which regulates a refractive power of the third lens unit and the refractive power of the fourth lens unit. By satisfying conditional expression (4), it is possible to achieve a high zooming ratio upon suppressing fluctuation of (change in) the chromatic aberration at the time of zooming and a curvature of field at the telephoto end.

When an upper limit of conditional expression (4) is surpassed, since the refractive power of the fourth lens unit becomes smaller with respect to the refractive power of the third lens unit, correction capability of the fourth lens unit for correcting the curvature of field at the telephoto end is degraded. Moreover, the zooming effect of the fourth lens unit becomes small. Consequently, when at attempt is made to increase the amount of movement of the fourth lens unit for improving the zooming ratio, the fluctuation of (change in) the chromatic aberration at the time of zooming increases. When a lower limit of conditional expression (4) is not reached, since the refractive power of the fourth lens unit becomes strong with respect to the refractive power of the third lens unit, a disadvantageous effect on performance due to decentering becomes large.

Moreover, it is desirable that the zoom lens satisfies the following conditional expression (5).

$$3.0 \leq |f3|/fw \leq 13.5 \quad (5)$$

where, f3 denotes a focal length of the third lens unit, and fw denotes a focal length of the overall zoom lens system at the wide angle end.

Conditional expression (5) is a conditional expression which regulates a focal length of the third lens unit, and the focal length of the third lens unit is standardized by a focal length at the wide angle end of the zoom lens. When conditional expression (5) is satisfied, it is possible to secure a balance of the refractive power of the third lens unit and the refractive power of the fourth lens unit while the third lens unit maintains the optimum refractive power.

When an upper limit of conditional expression (5) is not reached, the capability of correcting coma aberration carried out in the third lens unit is degraded. Moreover, the zooming effect in the third lens unit becomes small. Consequently, when an attempt is made to increase the amount of movement of the third lens unit for increasing the zooming effect of the third lens unit, the fluctuation of (change in) the chromatic aberration at the time of zooming becomes large. When a lower limit of conditional expression (5) is not reached, since the disadvantageous effect on the performance due to decentering becomes large, it becomes difficult to secure aberration performance.

Moreover, it is desirable that the zoom lens satisfies the following conditional expression (6).

$$\Sigma d2G/y \leq 1.5 \quad (6)$$

where, $\Sigma d2G$ denotes a distance between a lens surface nearest to the object side in the second lens unit and a lens surface nearest to an image side in the second lens unit, which is also a distance of the longest line segment from among line segments which are drawn in a direction parallel to an optical axis of each of a position on the optical axis and a position on a virtual line, y denotes the maximum image height on an image forming surface in the zoom lens, and the virtual line is a line which makes a contact with an aperture and which is parallel to the optical axis, when a diameter of the aperture of the zoom lens is the maximum.

Conditional expression (6) is a conditional expression for realizing a compact zoom lens, and is a conditional expression in which, the distance from the lens surface nearest to the object side in the second lens unit to the lens surface nearest to the image side in the second lens unit is standardized by the maximum image height on the image forming plane in the zoom lens. By satisfying conditional expression (6), it is possible to realize a compact zoom lens.

Figure 18:
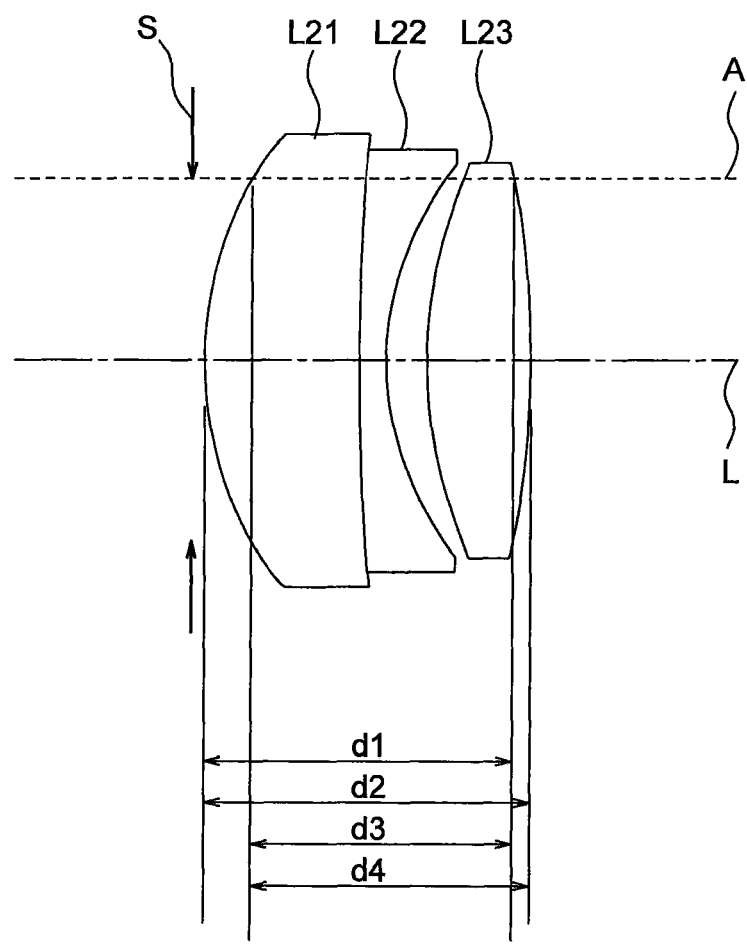
FIG. 18 is a diagram describing $\Sigma d2G$ in conditional expression (6).

Σd2G will be described below by referring to FIG. 18. In FIG. 18, L21, L22, and L23 denote lenses in the second lens unit, S denotes the aperture stop, L denotes the optical axis, and A denotes the virtual line segment. A front tip of an arrow of the aperture S indicates the maximum of aperture diameter. As shown in FIG. 18, the virtual line segment A makes a contact with the front tip of the arrow of the aperture stop S, and is parallel to the optical axis L. Moreover, d1, d2, d3, and d4 (hereinafter, 'd1 to d4') are line segments drawn in a direction parallel to the optical axis, with respect to the position on the optical axis and the position on the virtual line. From among the line segments d1 to d4, d2 is the longest line segment. Therefore Σd2G becomes Σd2G=d2.

When an upper limit of conditional expression (6) is surpassed, since the overall length of the second lens unit increases, it becomes difficult to let the zoom lens have a compact structure.

Moreover, it is desirable that the zoom lens satisfies the following conditional expression (7).

$$8.0 \leq dt/y \leq 12 \tag{7}$$

where, dt denotes an overall length of the zoom lens at the telephoto end, and y denotes the maximum image height on an image forming surface in the zoom lens.

Conditional expression (7) is a conditional expression which regulates the overall length of the zoom lens at the telephoto end, and is a conditional expression in which, the overall length of the zoom lens at the telephoto end is standardized by the maximum image height at the image forming surface. By satisfying conditional expression (7), it is possible to realize a compact zoom lens with a high zooming ratio. When conditional expression (1) is satisfied simultaneously (with conditional expression (7)), it is possible to realize a zoom lens which is more compact and has even higher zooming ratio.

When an upper limit of conditional expression (7) is surpassed, it becomes difficult to structure the zoom lens compactly. Moreover, when a lower limit of conditional expression (7) is not reached, the amount of movement of each lens unit is restricted, and consequently, it becomes difficult to secure the zooming ratio.

Moreover, in the zoom lens, it is desirable that a lens surface nearest to the object side of the second lens unit is convex toward the object side, and a lens surface nearest to the image side of the second lens unit is convex toward the image side.

When the lens surface nearest to the object side of the second lens unit is let to be convex toward the object side, and the lens surface nearest to the image side of the second lens unit is let to be convex toward the image side, it is possible to let a shape of the overall second lens unit to be biconvex. Accordingly, since it is possible to increase the refractive power of the second lens unit, it is possible to suppress the amount of movement of the second lens unit. As a result, it is possible to let the zoom lens have a compact structure.

Moreover, in the zoom lens, it is desirable that the first lens unit comprises two lenses, the third lens unit comprises one lens, and the fourth lens unit comprises one lens.

By using two lenses in the first lens unit and three lenses in the third lens unit, it is possible to suppress the chromatic aberration efficiently within the respective lens unit. Moreover, by structuring the third lens unit and the fourth lens unit by one lens respectively, it is possible to let the zoom lens have a compact structure.

Moreover, it is desirable that the zoom lens satisfies the following conditional expression (8).

$$fw/y \leq 1.3 \tag{8}$$

where, fw denotes a focal length of the overall zoom lens system at the wide angle end, and y denotes the maximum image height on an image forming lens in the zoom lens.

Conditional expression (8) is a conditional expression which regulates the focal length at the wide angle end of the zoom lens, and which standardizes the focal length at the wide angle end of the zoom lens by the maximum image height at the image forming surface in the zoom lens.

When an upper limit of conditional expression (8) is surpassed, the focal length at the wide angle end increases, and therefore, an angle of view at the wide angle end becomes small. Moreover, when the focal length at the wide angle end increases, the overall optical length increases. Therefore, it becomes difficult to let the zoom lens have a compact structure.

Moreover, an image pickup apparatus according to the present invention comprises the zoom lens, and an image pickup element which is disposed on an image side of the zoom lens, and which converts an optical image formed by the zoom lens to an electric signal. By making such an arrangement, it is possible to realize an image pickup apparatus which is thin and which has a high zooming ratio at the wide angle of view.

Moreover, regarding each of the abovementioned conditional expressions, the following expressions are more preferable.

$$ft/fw \geq 5.4 \tag{1'}$$

$$ft/fw \geq 5.74 \tag{1''}$$

$$0.38 \leq \Delta 2G(w-t)/dt \leq 0.54 \tag{2'}$$

$$0.42 \leq \Delta 2G(w-t)/dt \leq 0.48 \tag{2''}$$

$$0 < \Delta 3G(w-t)/\Delta 2G(w-t) \leq 0.6 \tag{3'}$$

$$0.2 < \Delta 3G(w-t)/\Delta 2G(w-t) \leq 0.6 \tag{3''}$$

$$0.2 \leq |\phi_3/\phi_4| \leq 1.3 \tag{4'}$$

$$0.29 \leq |\phi_3/\phi_4| \leq 1.1 \tag{4''}$$

$$0.5 \leq |\phi_3/\phi_4| \leq 1.1 \tag{4'''}$$

$$3.15 \leq |\beta 3|/fw \leq 13.45 \tag{5'}$$

$$3.30 |\beta 3|/fw \leq 13.4 \tag{5''}$$

$$3.30 \leq |\beta 3|/fw \leq 10.0 \tag{5'''}$$

$$\Sigma d2G/y \leq 1.4 \tag{6'}$$

$$\Sigma d2G/y \leq 1.25 \tag{6''}$$

$$8.5 \leq dt/y \leq 11.6 \tag{7'}$$

$$9.0 \leq dt/y \leq 11.2 \tag{7''}$$

$$fw/y \leq 1.2 \tag{8'}$$

$$fw/y \leq 1.15 \tag{8''}$$

An action and an effect due to the structure of the zoom lens and the image pickup apparatus according to the embodiments will be described below. However, the present invention is not restricted to the embodiments described below. In other words, description of the embodiments includes a large amount of specific details for exemplification. However, even when various variations and modifications are made in these details, the variations and modifications are within a range of the present invention. Consequently, the exemplary embodiments of the present invention which are described below do not lead to loss of generality of the invention for which the right has been claimed, and do not restrict the invention for which the right has been claimed.

Embodiments from a first embodiment to a sixth embodiment of the zoom lens according to the present invention will be described below.

FIG. 1A, FIG. 2A, FIG. 3A, FIG. 4A, FIG. 5A, and FIG. 6A are lens cross-sectional views at a wide angle end at the time of infinite object point focusing of the embodiments from the first embodiment to the sixth embodiment respectively.

FIG. 1B, FIG. 2B, FIG. 3B, FIG. 4B, FIG. 5B, and FIG. 6B are lens cross-sectional views in an intermediate state at the time of infinite object point focusing of the embodiments from the first embodiment to the sixth embodiment respectively.

FIG. 1C, FIG. 2C, FIG. 3C, FIG. 4C, FIG. 5C, and FIG. 6C are lens cross-sectional views at a telephoto end at the time of infinite object point focusing of the embodiments from the first embodiment to the sixth embodiment respectively.

In diagrams from FIG. 1A to FIG. 6C, a first lens unit is denotes by G1, a second lens unit is denoted by G2, an aperture stop is denoted by S, a third lens unit is denoted by G3, a fourth lens unit is denoted by G4, a parallel-flat plate which forms a low-pass filter on which, a wavelength-band width restricting coating which restricts infrared light has been applied, is denoted by F, a parallel-flat plate of a cover glass of an electronic image pickup element is denoted by C, and an image plane is denoted by I. A multilayer film for restricting a wavelength region may be provided on a surface of the cover glass C. Moreover, an arrangement may be made such that a low-pass filter effect is imparted to the cover glass C.

Moreover, in each embodiment, the aperture stop S moves integrally with the second lens unit G2. Each numerical data is data in a state when focused at an object at infinity. A unit of length of each numerical value is mm and a unit of an angle is ° (degree). Focusing in all the embodiments is to be carried out by moving a lens unit nearest to an image side. Furthermore, zoom data are values at a wide angle end (WE), in an intermediate focal length state (ST), and at a telephoto end (TE). Moreover, a sign (positive or negative) of a refractive power is based on a paraxial radius of curvature.

A flare stop may be provided optionally in addition to the aperture stop in order to eliminate unwanted light that may cause ghost images, lens flare or the like.

The flare stop may be disposed on the object side of the first lens unit, between the first lens unit and the second lens unit, between the second lens unit and the third lens unit, between the third lens unit and the fourth lens unit, or between the fourth lens unit and the image plane.

Alternatively, a frame member may be adapted to cut flare rays, or another member may be adapted to serve as a flare stop. Alternatively, a flare stop may be provided on a component in the optical system by direct printing, by painting, or by attaching a sheet or the like. The aperture of the flare stop may have various shapes such as circular, elliptical, rectangular, or polygonal shape, or the shape of the aperture may be defined by a curve specified by a mathematical function. The flare stop may be adapted to cut not only hazardous beams but also beams that may cause coma flare etc. in the peripheral region of the picture area.

Anti-reflection coating may be applied on a surface (s) of lens component(s) to reduce ghost images and lens flare. The use of multi-layer coating as anti-reflection coating, which can reduce ghost images and lens flare effectively, is desirable. For preventing the occurrence of the ghost and the flare, generally, the anti-reflection coating is applied to a surface of a lens in contact with air. Coating for cutting infrared light may be applied on a lens surface (s) and/or the cover glass etc.

On the other hand, at a cemented surface of a cemented lens, a refractive index of an adhesive is sufficiently higher than a refractive index of air. Therefore, in many cases, a reflectance at the cemented surface of a cemented lens is originally of the level of a single-layer coating, or lower. As a result, the coating for the cemented surface of a cemented lens is applied in few cases. However, when the antireflection coating is applied positively even to the cemented surface, it is possible to reduce further the ghost and the flare, and to achieve a more favorable image.

Particularly, a glass material having a high refractive index, which is widely used recently, has a high effect on the aberration correction. Therefore a glass material having a high refractive index has been frequently used in an optical system of cameras. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482.

Zoom lens of these patent literatures is a positive preceding zoom lens system, and a cemented lens surface coating has been described in these patent literatures. Therefore the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

Moreover, for focusing for carrying out focus adjustment, the fourth lens unit or the third lens unit is desirable. When the focusing is carried out by the fourth lens unit or the third lens unit, since the lens-weight is light, a load exerted on a motor is less. The focusing may be carried out by the other lens units. Moreover, the focusing may also be carried out by moving a plurality of lens units. The focusing may be carried out by drawing the entire lens system out, or by drawing out some of the lenses, or by drawing in some of the lenses.

Figure 1B:
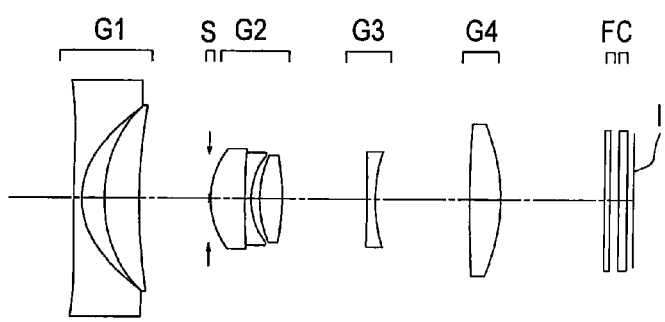
Figure 1C:
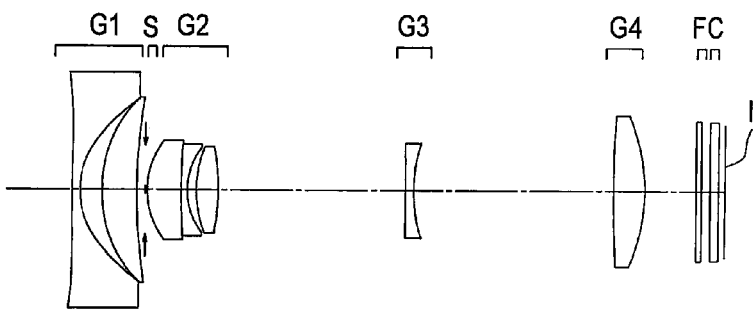

A zoom lens according to the first embodiment, as shown in FIG. 1A, FIG. 1B, and FIG. 1C, includes in order from an object side, a first lens unit G1 having a negative refractive power, an aperture stop S, a second lens unit G2 having a positive refractive power, a third lens unit G3 having a negative refractive power, and a fourth lens unit G4 having a positive refractive power.

At the time of zooming from the wide angle end to the telephoto end, the first lens unit G1, after moving toward an image plane side, moves toward the object side. The second lens unit G2 moves toward the object side. The third lens unit G3 moves toward the object side. The fourth lens unit G4, after moving toward the object side, moves toward an image side. Therefore, a distance between the first lens unit and the second lens unit decreases, a distance between the second lens unit and the third lens unit increases, and a distance between the third lens unit and the fourth lens unit increases.

In order from the object side, the first lens unit G1 includes a negative meniscus lens having a convex surface directed toward the object side and a positive meniscus lens having a convex surface directed toward the object side. The second lens unit G2 includes a positive meniscus lens having a convex surface directed toward the object side, a negative meniscus lens having a convex surface directed toward the object side, and a biconvex positive lens. The third lens unit G3 includes a biconcave negative lens. The fourth lens unit G4 includes a biconvex positive lens.

An aspheric surface is provided to nine surfaces namely, both surfaces of the negative meniscus lens having the convex surface directed toward the object side and both surfaces of the positive meniscus lens having the convex surface directed toward the object side in the first lens unit G1, a surface on the object side of the positive meniscus lens having the convex surface directed toward the object side and both surfaces of the biconvex positive lens in the second lens unit G2, a surface on the image side of the biconcave negative lens in the third lens unit G3, and a surface on the image side of the biconvex positive lens in the fourth lens unit G4.

Figure 2A:
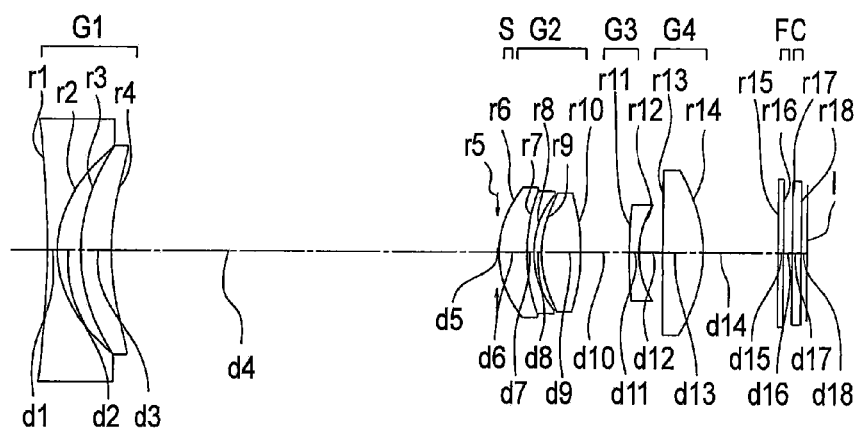
FIG. 2A, FIG. 2B, and FIG. 2C are diagrams similar to FIG. 1A, FIG. 1B, and FIG. 1C respectively, of a second embodiment of the zoom lens according to the present invention.
Figure 2B:
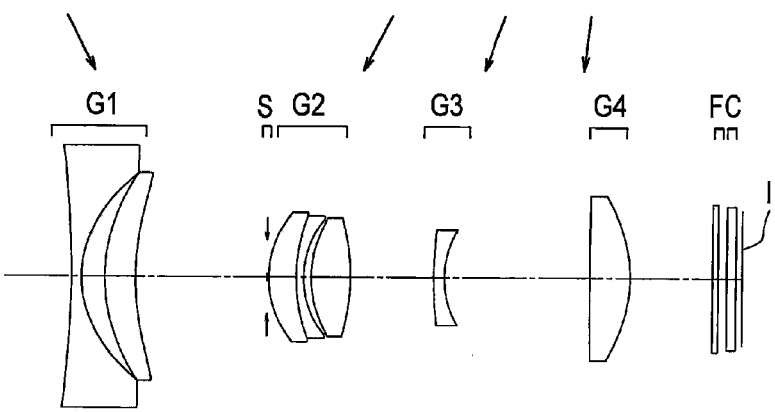
Figure 2C:
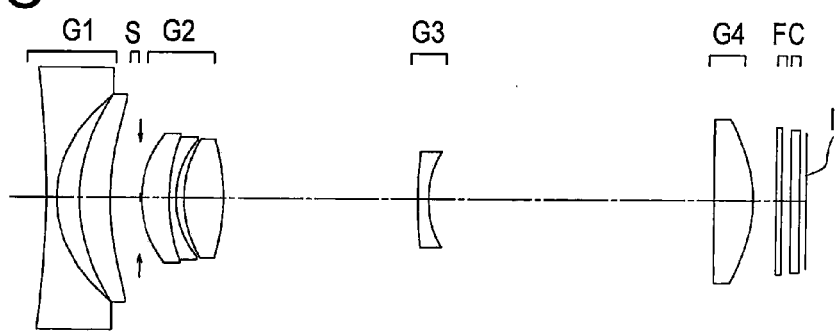

A zoom lens according to the second embodiment, as shown in FIG. 2A, FIG. 2B, and FIG. 2C, includes in order from an object side, a first lens unit G1 having a negative refractive power, an aperture stop S, a second lens unit G2 having a positive refractive power, a third lens unit G3 having a negative refractive power, and a fourth lens unit G4 having a positive refractive power.

At the time of zooming from the wide angle end to the telephoto end, the first lens unit G1, after moving toward an image plane side, moves toward the object side. The second lens unit G2 moves toward the object side. The third lens unit G3 moves toward the object side. The fourth lens unit G4, after moving toward the object side, moves toward an image side. Therefore, a distance between the first lens unit G1 and the second lens unit G2 decreases, a distance between the second lens unit G2 and the third lens unit G3 increases, and a distance between the third lens unit G3 and the fourth lens unit G4 increases.

In order from the object side, the first lens unit G1 includes a biconcave negative lens and a positive meniscus lens having a convex surface directed toward the object side. The second lens unit G2 includes a positive meniscus lens having a convex surface directed toward the object side, a negative meniscus lens having a convex surface directed toward the object side, and a biconvex positive lens. The third lens unit G3 includes a negative meniscus lens having a convex surface directed toward the object side. The fourth lens unit G4 includes a biconvex positive lens.

An aspheric surface is provided to nine surfaces namely, both surfaces of the biconcave negative lens and both surfaces of the positive meniscus lens having the convex surface directed toward the object side in the first lens unit G1, a surface on the object side of the positive meniscus lens having the convex surface directed toward the object side and both surfaces of the biconvex positive lens in the second lens unit G2, a surface on the image side of the negative meniscus lens having a convex surface directed toward the object side in the third lens unit G3, and a surface on the image side of the biconvex positive lens in the fourth lens unit G4.

Figure 3A:
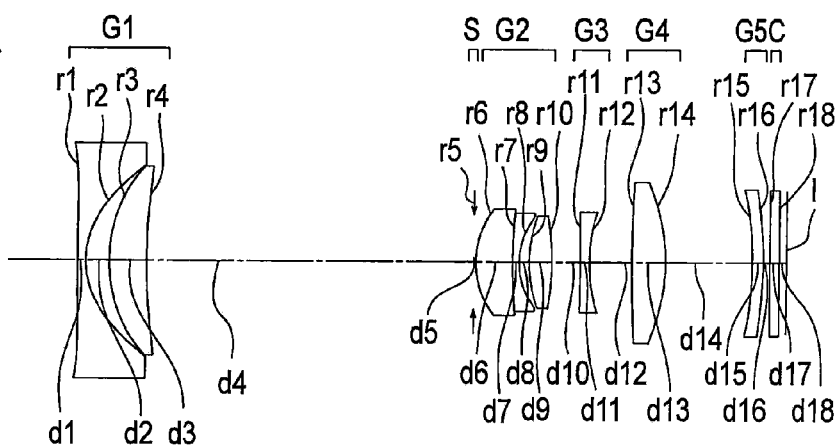
FIG. 3A, FIG. 3B, and FIG. 3C are diagrams similar to FIG. 1A, FIG. 1B, and FIG. 1C respectively, of a third embodiment of the zoom lens according to the present invention.
Figure 3B:
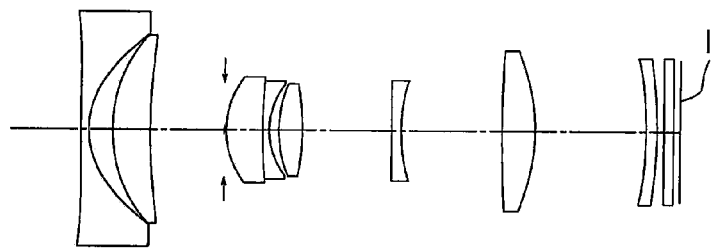
Figure 3C:
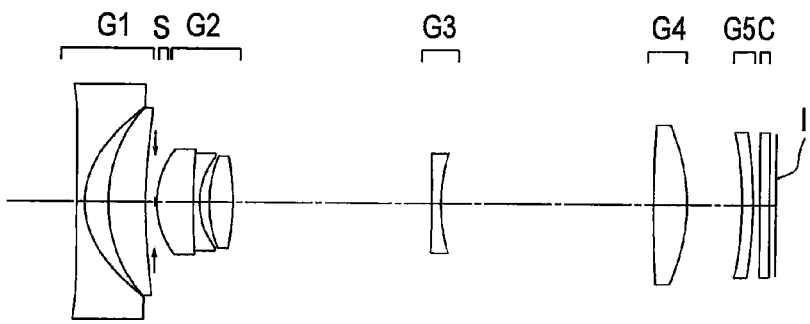

A zoom lens according to the third embodiment, as shown in FIG. 3A, FIG. 3B, and FIG. 3C, includes in order from an object side, a first lens unit G1 having a negative refractive power, an aperture stop S, a second lens unit G2 having a positive refractive power, a third lens unit G3 having a negative refractive power, a fourth lens unit G4 having a positive refractive power, and a fifth lens unit G5 having a positive refractive power.

At the time of zooming from the wide angle end to the telephoto end, the first lens unit G1, after moving toward an image plane side, moves toward the object side. The second lens unit G2 moves toward the object side. The third lens unit G3 moves toward the object side. The fourth lens unit G4, after moving toward the object side, moves toward an image side. The fifth lens unit G5 is fixed. Therefore, a distance between the first lens unit G1 and the second lens unit G2 decreases, a distance between the second lens unit G2 and the third lens unit G3 increases, and a distance between the third lens unit G3 and the fourth lens unit G4 increases.

In order from the object side, the first lens unit G1 includes a negative meniscus lens having a convex surface directed toward the object side and a positive meniscus lens having a convex surface directed toward the object side. The second lens unit G2 includes a positive meniscus lens having a convex surface directed toward the object side, a negative meniscus lens having a convex surface directed toward the object side, and a biconvex positive lens. The third lens unit G3 includes a biconcave negative lens. The fourth lens unit G4 includes a biconvex positive lens. The fifth lens unit G5 includes a positive meniscus lens having a convex surface directed toward the image side.

An aspheric surface is provided to 10 surfaces namely, both surfaces of the negative meniscus lens having the convex surface directed toward the object side and both surfaces of the positive meniscus lens having the convex surface directed toward the object side in the first lens unit G1, a surface on the object side of the positive meniscus lens having the convex surface directed toward the object side and both surfaces of the biconvex positive lens in the second lens unit G2, a surface on the image side of the biconcave negative lens in the third lens unit G3, a surface on the image side of the biconvex positive lens in the fourth lens unit G4, and a surface on the object side of the positive meniscus lens having the convex surface directed toward the image side.

A zoom lens according to the fourth embodiment, as shown in FIG. 4A, FIG. 4B, and FIG. 4C, includes in order from an object side, a first lens unit G1 having a negative refractive power, an aperture stop S, a second lens unit G2 having a positive refractive power, a third lens unit G3 having a negative refractive power, and a fourth lens unit G4 having a positive refractive power.

At the time of zooming from the wide angle end to the telephoto end, the first lens unit G1, after moving toward an image plane side, moves toward the object side. The second lens unit G2 moves toward the object side. The third lens unit G3 moves toward the object side. The fourth lens unit G4, after moving toward the object side, moves toward the image side. Therefore, a distance between the first lens unit and the second lens unit decreases, a distance between the second lens unit and the third lens unit increases, and a distance between the third lens unit and the fourth lens unit increases.

In order from the object side, the first lens unit G1 includes a biconcave negative lens and a positive meniscus lens having a convex surface directed toward the object side. The second lens unit G2 includes a positive meniscus lens having a convex surface directed toward the object side, a negative meniscus lens having a convex surface directed toward the object side, and a biconvex positive lens. The third lens unit G3 includes a negative meniscus lens having a convex surface directed toward the object side. The fourth lens unit G4 includes a positive meniscus lens having a convex surface directed toward the image side.

An aspheric surface is provided to nine surfaces namely, both surfaces of the biconcave negative and both surfaces of the positive meniscus lens having the convex surface directed toward the object side in the first lens unit G1, a surface on the object side of the positive meniscus lens having the convex surface directed toward the object side and both surfaces of the biconvex positive lens in the second lens unit G2, a surface on the image side of the negative meniscus lens having a convex surface directed toward the object side in the third lens unit G3, and a surface on the image side of the positive meniscus lens having a convex surface directed toward the image side in the fourth lens unit G4.

Figure 5A:
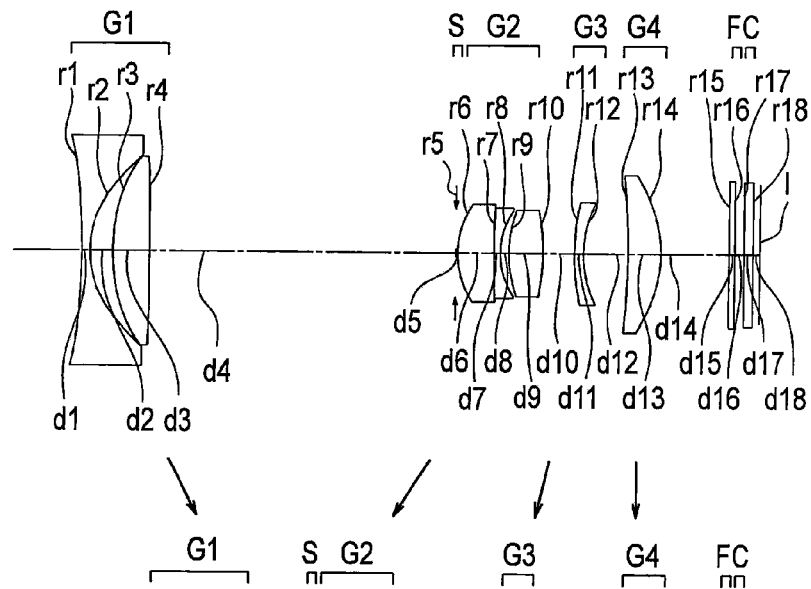
FIG. 5A, FIG. 5B, and FIG. 5C are diagrams similar to FIG. 1A, FIG. 1B, and FIG. 1C respectively, of a fifth embodiment of the zoom lens according to the present invention.
Figure 5B:
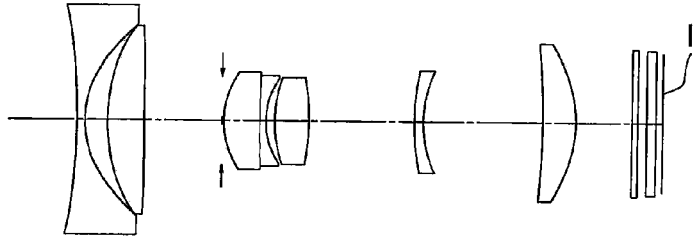
Figure 5C:
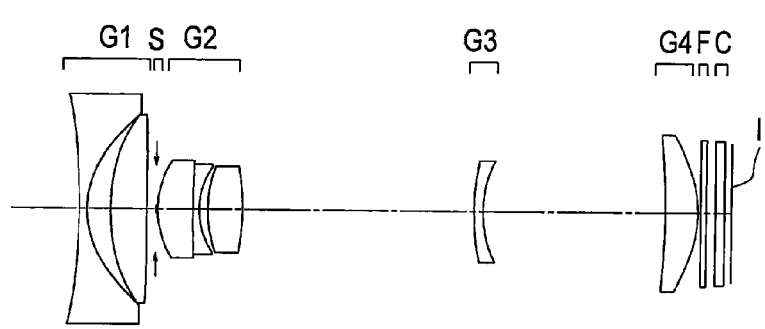

A zoom lens according to the fifth embodiment, as shown in FIG. 5A, FIG. 5B, and FIG. 5C, includes in order from an object side, a first lens unit G1 having a negative refractive power, an aperture stop S, a second lens unit G2 having a positive refractive power, a third lens unit G3 having a negative refractive power, and a fourth lens unit G4 having a positive refractive power.

At the time of zooming from the wide angle end to the telephoto end, the first lens unit G1, after moving toward an image plane side, moves toward the object side. The second lens unit G2 moves toward the object side. The third lens unit G3 moves toward the object side. The fourth lens unit G4, after moving toward the object side, moves toward the image side. Therefore, a distance between the first lens unit G1 and the second lens unit G2 decreases, a distance between the second lens unit G2 and the third lens unit G3 increases, and a distance between the third lens unit G3 and the fourth lens unit G4 increases.

From the object side, the first lens unit G1 includes a biconcave negative lens and a positive meniscus lens having a convex surface directed toward the object side. The second lens unit G2 includes a positive meniscus lens having a convex surface directed toward the object side, a negative meniscus lens having a convex surface directed toward the object side, and a biconvex positive lens. The third lens unit G3 includes a negative meniscus lens having a convex surface directed toward the object side. The fourth lens unit G4 includes a positive meniscus lens having a convex surface directed toward the image side.

An aspheric surface is provided to nine surfaces namely both surfaces of the biconcave negative lens and both surfaces of the positive meniscus lens having the convex surface directed toward the object side in the first lens unit G1, a surface on the object side of the positive meniscus lens having the convex surface directed toward the object side, and both surfaces of the biconvex positive lens in the second lens unit G2, a surface on the image side of the negative meniscus lens having a convex surface directed toward the object side in the third lens unit G3, and a surface on the image side of the biconvex positive lens in the fourth lens unit G4.

Figure 6A:
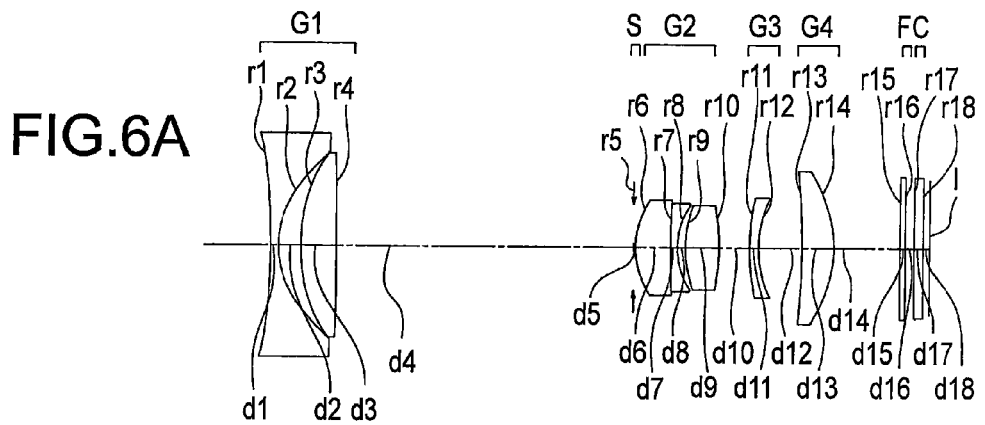
FIG. 6A, FIG. 6B, and FIG. 6C are diagrams similar to FIG. 1A, FIG. 1B, and FIG. 1C respectively, of a sixth embodiment of the zoom lens according to the present invention.
Figure 6B:
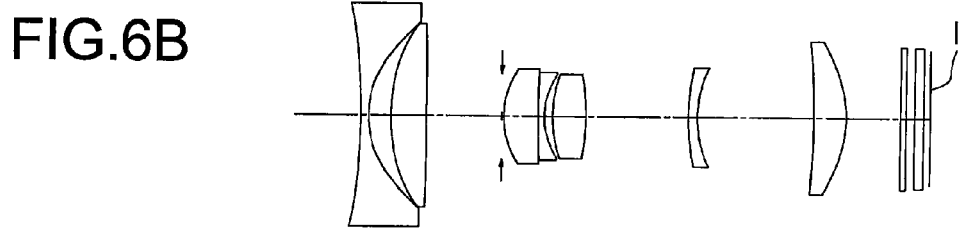
Figure 6C:
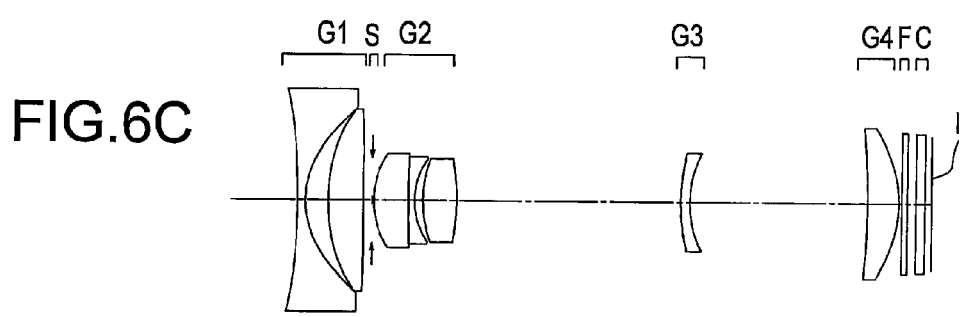

A zoom lens according to the sixth embodiment, as shown in FIG. 6A, FIG. 6B, and FIG. 6C, includes in order from an object side, a first lens unit G1 having a negative refractive power, an aperture stop S, a second lens unit G2 having a positive refractive power, a third lens unit G3 having a negative refractive power, and a fourth lens unit G4 having a positive refractive power.

At the time of zooming from the wide angle end to the telephoto end, the first lens unit G1, after moving toward an image plane surface side, moved toward the object side. The second lens unit G2 moves toward the object side. The third lens unit G3 moves toward the object side. The fourth lens unit G4, after moving toward the object side, moves toward the image side. Therefore, a distance between the first lens unit G1 and the second unit G2 decreases, a distance between the second lens unit G2 and the third lens unit G3 increases, and a distance between the third lens unit G3 and the fourth lens unit G4 increases.

In order from the object side, the first lens unit G1 includes a biconcave negative lens and a positive meniscus lens having a convex surface directed toward the object side. The second lens unit G2 includes a positive meniscus lens having a convex surface directed toward the object side, a negative meniscus lens having a convex surface directed toward the object side, and a biconvex positive lens. The third lens unit G3 includes a negative meniscus lens having a convex surface directed toward the object side. The fourth lens unit G4 includes a positive meniscus lens having a convex surface directed toward the image side.

An aspheric surface is used for nine surfaces namely, both surfaces of the biconcave negative lens and both surfaces of the positive meniscus lens having the convex surface directed toward the object side in the first lens unit G1, a surface on the object side of the positive meniscus lens having the convex surface directed toward the object side and both surfaces of the biconvex positive lens in the second lens unit G2, a surface on the image side of the negative meniscus lens having a convex surface directed toward the object side in the third lens unit G3, and a surface on the image side of the positive meniscus lens having a convex surface directed toward the image side in the fourth lens unit G4.

Numerical data of each embodiment described above is shown below. Apart from symbols described above, f denotes a focal length of the entire zoom lens system, BF denotes back focus, f1, f2, . . . denotes focal length of each lens unit, IH denotes a image height, $F_{NO}$ denotes an F number, ω denotes a half angle of field, WE denotes a wide angle end, ST denotes an intermediate state, TE denotes a telephoto end, r denotes radius of curvature of each lens surface, d denotes each of distance between two lenses, nd denotes a refractive index of each lens for a d-line, and vd denotes an Abbe constant for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A4y^4+A6y^6+A8y^8+A10y^{10}+A12y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

Unit mm

Surface data

| Surface no. | r | d | nd | vd |
|---|---|---|---|---|
| Object plane | ∞ | ∞ | | |
| 1* | 283.133 | 0.45 | 1.74320 | 49.34 |
| 2* | 4.463 | 1.30 | | |
| 3* | 8.450 | 2.00 | 1.63493 | 23.90 |
| 4* | 31.322 | Variable | | |
| 5 (Stop) | ∞ | 0.10 | | |
| 6* | 4.583 | 1.99 | 1.74320 | 49.34 |
| 7 | 35.623 | 0.35 | 1.68893 | 31.07 |
| 8 | 3.996 | 0.51 | | |
| 9* | 5.959 | 1.27 | 1.49700 | 81.54 |
| 10* | −13.883 | Variable | | |
| 11 | −157.605 | 0.50 | 1.53071 | 55.69 |
| 12* | 9.935 | Variable | | |
| 13 | 69.552 | 1.80 | 1.53071 | 55.69 |
| 14* | −10.363 | Variable | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 6.84901e−05, A6 = −8.33023e−06, A8 = 1.22648e−07,
A10 = −6.72800e−10

2nd surface

K = −0.761
A4 = 3.77706e−04, A6 = −4.12051e−06, A8 = −3.43048e−07

3td surface

K = 0.000
A4 = 3.52168e−04

-continued

Unit mm

4th surface

K = 0.000
A4 = 2.30604e−05, A6 = 6.44907e−06, A8 = −6.85607e−07,
A10 = 1.46814e−08

6th surface

K = −0.373
A4 = 2.47927e−04, A6 = −5.02956e−06, A8 = 9.20528e−07

9th surface

K = −0.859
A4 = −8.57863e−04, A6 = 4.63418e−05

10th surface

K = 0.000
A4 = −2.74028e−04, A6 = 1.38205e−05, A8 = 5.74087e−06

12th surface

K = 0.000
A4 = 8.27027e−04, A6 = −3.68947e−05

14th surface

K = 0.000
A4 = 1.45508e−04, A6 = 2.20566e−06, A8 = 4.67234e−08

Zoom data

| | WE | ST | TE |
|---|---|---|---|
| Image height | 3.84 | 3.84 | 3.84 |
| Focal length | 4.32 | 11.79 | 24.95 |
| Fno. | 2.57 | 3.92 | 6.59 |
| Angle of field 2ω | 94.79 | 35.32 | 16.98 |
| BF (in air) | 6.11 | 7.40 | 4.38 |
| Lens total length (in air) | 37.93 | 32.01 | 37.45 |
| d4 | 17.75 | 4.06 | 0.50 |
| d10 | 1.51 | 4.85 | 10.81 |
| d12 | 2.30 | 5.43 | 11.49 |
| d14 | 4.71 | 6.01 | 3.00 |

Unit focal length

| f1 = −10.09 | f2 = 8.69 | f3 = −17.59 | f4 = 17.13 |
|---|---|---|---|

EXAMPLE 2

Unit mm

Surface data

| Surface no. | r | d | nd | vd |
|---|---|---|---|---|
| Object plane | ∞ | ∞ | | |
| 1* | −39.538 | 0.60 | 1.74320 | 49.34 |
| 2* | 6.071 | 1.30 | | |
| 3* | 9.203 | 1.73 | 2.00129 | 20.64 |
| 4* | 14.389 | Variable | | |
| 5 (Stop) | ∞ | 0.10 | | |
| 6* | 5.623 | 1.56 | 1.80610 | 40.92 |
| 7 | 10.050 | 0.40 | 1.84666 | 23.78 |
| 8 | 5.185 | 0.44 | | |
| 9* | 5.868 | 2.23 | 1.49700 | 81.54 |
| 10* | −11.739 | Variable | | |
| 11 | 24.038 | 0.60 | 1.53071 | 55.69 |
| 12* | 5.534 | Variable | | |
| 13 | 302.806 | 2.25 | 1.53071 | 55.69 |
| 14* | −7.885 | Variable | | |
| 15 | ∞ | 0.30 | 1.51633 | 64.14 |
| 16 | ∞ | 0.50 | | |
| 17 | ∞ | 0.50 | 1.51633 | 64.14 |

-continued

Unit mm

| 18 | ∞ | 0.37 | | |
| Image plane<br>(Light receiving surface) | ∞ | | | |

Aspherical surface data

1st surface

K = 0.000
A4 = 2.54412e−04, A6 = −6.06770e−06, A8 = 7.48500e−08,
A10 = −4.45000e−10
2nd surface K = −1.247
A4 = 4.08850e−05, A6 = 2.11073e−05, A8 = −3.23402e−07
3td surface K = 0.000
A4 = −2.28624e−04
4th surface K = 0.000
A4 = 1.22707e−05, A6 = −1.73667e−05, A8 = 4.35113e−07,
A10 = −4.37631e−09
6th surface K = −0.285
A4 = 2.29129e−04, A6 = −1.51407e−05, A8 = 5.51813e−07
9th surface K = −0.954
A4 = −6.73859e−04, A6 = 3.07853e−05
10th surface K = 0.000
A4 = 5.18933e−05, A6 = 1.77375e−06, A8 = 8.82455e−07
12th surface K = 0.000
A4 = 4.60787e−04, A6 = 1.14881e−05
14th surface K = 0.000
A4 = 5.61312e−04, A6 = −9.25884e−06, A8 = 1.72700e−07

Zoom data

|  | WE | ST | TE |
|---|---|---|---|
| Image height | 3.84 | 3.84 | 3.84 |
| Focal length | 4.08 | 11.29 | 31.30 |
| Fno. | 3.21 | 5.17 | 6.67 |
| Angle of field 2ω | 97.91 | 36.30 | 14.03 |
| BF (in air) | 5.65 | 6.06 | 2.70 |
| Lens total length (in air) | 42.73 | 37.67 | 42.73 |
| d4 | 21.86 | 7.46 | 1.70 |
| d10 | 2.70 | 4.71 | 11.03 |
| d12 | 1.30 | 8.22 | 16.09 |
| d14 | 4.26 | 4.66 | 1.30 |

Unit focal length

| f1 = −10.41 | f2 = 9.03 | f3 = −13.70 | f4 = 14.52 |

EXAMPLE 3

Unit mm

Surface data

| Surface no. | r | d | nd | νd |
|---|---|---|---|---|
| Object plane | ∞ | ∞ | | |
| 1* | 290.650 | 0.45 | 1.74320 | 49.34 |

-continued

Unit mm

| 2* | 4.462 | 1.30 | | |
| 3* | 8.425 | 2.00 | 1.63493 | 23.90 |
| 4* | 31.783 | Variable | | |
| 5 (Stop) | ∞ | 0.10 | | |
| 6* | 4.583 | 1.99 | 1.74320 | 49.34 |
| 7 | 31.019 | 0.35 | 1.68893 | 31.07 |
| 8 | 3.996 | 0.51 | | |
| 9* | 5.972 | 1.27 | 1.49700 | 81.54 |
| 10* | −13.931 | Variable | | |
| 11 | −164.384 | 0.50 | 1.53071 | 55.69 |
| 12* | 9.954 | Variable | | |
| 13 | 68.341 | 1.80 | 1.53071 | 55.69 |
| 14* | −10.335 | Variable | | |
| 15* | −25.000 | 0.60 | 1.51633 | 64.14 |
| 16 | −25.000 | 0.35 | | |
| 17 | ∞ | 0.50 | 1.51633 | 64.14 |
| 18 | ∞ | 0.37 | | |
| Image plane<br>(Light receiving surface) | ∞ | | | |

Aspherical surface data

1st surface

K = 0.000
A4 = 6.91736e−05, A6 = −9.82214e−06, A8 = 1.38631e−07,
A10 = −5.91818e−10
2nd surface K = −0.761
A4 = 3.48404e−04, A6 = −1.19235e−05, A8 = −1.21454e−07
3td surface K = 0.000
A4 = 2.88704e−04
4th surface K = 0.000
A4 = 6.16666e−05, A6 = 2.32444e−06, A8 = −6.29438e−07,
A10 = 1.38917e−08
6th surface K = −0.373
A4 = 2.06263e−04, A6 = −8.01337e−06, A8 = 9.59479e−07
9th surface K = −0.859
A4 = −7.45192e−04, A6 = 5.56460e−05
10th surface K = 0.000
A4 = −3.62399e−04, A6 = 2.08596e−05, A8 = 4.79844e−06
12th surface K = 0.000
A4 = 8.40737e−04, A6 = −2.54416e−05
14th surface K = 0.000
A4 = 1.89960e−04, A6 = −3.41510e−06, A8 = 4.60717e−08
15th surface K = 0.000
A4 = −5.56690e−04, A6 = −1.34100e−05, A8 = −3.24840e−07

Zoom data

|  | WE | ST | TE |
|---|---|---|---|
| Image height | 3.84 | 3.84 | 3.84 |
| Focal length | 4.37 | 11.88 | 25.10 |
| Fno. | 2.60 | 3.95 | 6.63 |
| Angle of field 2ω | 93.56 | 34.62 | 16.71 |
| BF (in air) | 1.05 | 1.05 | 1.05 |
| Lens total length (in air) | 38.18 | 32.26 | 37.71 |
| d4 | 17.75 | 4.06 | 0.50 |
| d10 | 1.51 | 4.85 | 10.81 |

-continued

Unit mm

| | | | |
|---|---|---|---|
| d12 | 2.30 | 5.43 | 11.49 |
| d14 | 4.71 | 6.01 | 3.00 |

Unit focal length

| | | | | |
|---|---|---|---|---|
| f1 = −10.15 | f2 = 8.73 | f3 = −17.67 | f4 = 17.05 | f5 = 5924.72 |

EXAMPLE 4

Unit mm

Surface data

| Surface no. | r | d | nd | vd |
|---|---|---|---|---|
| Object plane | ∞ | ∞ | | |
| 1* | −2618.256 | 0.30 | 1.74320 | 49.34 |
| 2* | 4.653 | 1.36 | | |
| 3* | 8.689 | 2.27 | 1.63493 | 23.90 |
| 4* | 26.736 | Variable | | |
| 5 (Stop) | ∞ | 0.10 | | |
| 6* | 4.425 | 1.96 | 1.74320 | 49.34 |
| 7 | 22.645 | 0.30 | 1.68893 | 31.07 |
| 8 | 3.903 | 0.47 | | |
| 9* | 6.532 | 1.52 | 1.49700 | 81.54 |
| 10* | −11.296 | Variable | | |
| 11 | 30.000 | 0.50 | 1.53071 | 55.69 |
| 12* | 8.343 | Variable | | |
| 13 | −40.000 | 1.70 | 1.53071 | 55.69 |
| 14* | −6.630 | Variable | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 2.85469e−05, A6 = −7.75018e−06, A8 = 1.11878e−07,
A10 = −4.81268e−10
2nd surface K = −0.742
A4 = 4.77485e−04, A6 = −1.41360e−05, A8 = −1.36444e−07
3td surface K = 0.000
A4 = 2.82573e−04
4th surface K = 0.000
A4 = −1.03469e−04, A6 = 4.44622e−06, A8 = −5.59528e−07,
A10 = 1.38238e−08
6th surface K = −0.387
A4 = 1.99356e−04, A6 = −8.98759e−06, A8 = 5.09602e−07
9th surface K = −1.004
A4 = −9.43803e−04, A6 = 5.55426e−05
10th surface K = 0.000
A4 = −4.68722e−04, A6 = 3.65876e−05, A8 = −1.55716e−06

-continued

Unit mm

12th surface

K = 0.000
A4 = 7.98098e−04, A6 = −2.02486e−05
14th surface

K = 0.000
A4 = 1.03338e−03, A6 = −2.07608e−05, A8 = 6.17717e−07

Zoom data

| | WE | ST | TE |
|---|---|---|---|
| Image height | 3.84 | 3.84 | 3.84 |
| Focal length | 3.98 | 10.87 | 23.02 |
| Fno. | 2.49 | 4.04 | 6.67 |
| Angle of field 2ω | 100.58 | 37.52 | 18.64 |
| BF (in air) | 5.04 | 4.63 | 2.08 |
| Lens total length (in air) | 35.53 | 31.39 | 34.77 |
| d4 | 16.12 | 4.29 | 0.50 |
| d10 | 1.89 | 4.73 | 10.81 |
| d12 | 2.00 | 7.26 | 10.90 |
| d14 | 3.64 | 3.24 | 0.68 |

Unit focal length

| | | | |
|---|---|---|---|
| f1 = −9.78 | f1 = 8.59 | f1 = −21.95 | f1 = 14.71 |

EXAMPLE 5

Unit mm

Surface data

| Surface no. | r | d | nd | vd |
|---|---|---|---|---|
| Object plane | ∞ | ∞ | | |
| 1* | −40.985 | 0.45 | 1.74320 | 49.34 |
| 2* | 5.175 | 1.30 | | |
| 3* | 11.586 | 2.00 | 1.63493 | 23.90 |
| 4* | 389.892 | Variable | | |
| 5 (Stop) | ∞ | 0.10 | | |
| 6* | 4.755 | 1.99 | 1.74320 | 49.34 |
| 7 | 54.818 | 0.35 | 1.68893 | 31.07 |
| 8 | 4.194 | 0.47 | | |
| 9* | 6.642 | 1.90 | 1.49700 | 81.54 |
| 10* | −13.548 | Variable | | |
| 11 | 13.288 | 0.50 | 1.53071 | 55.69 |
| 12* | 6.628 | Variable | | |
| 13 | −41.749 | 1.80 | 1.53071 | 55.69 |
| 14* | −6.757 | Variable | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 9.87561e−05, A6 = −8.26858e−06, A8 = 1.28195e−07,
A10 = −6.35000e−10
2nd surface K = −0.762
A4 = 3.84815e−04, A6 = −1.06520e−05, A8 = −9.12385e−08

-continued

Unit mm

3td surface

K = 0.000
A4 = 4.12216e−04
4th surface

K = 0.000
A4 = −5.82024e−05, A6 = 1.30871e−06, A8 = −4.04389e−07,
A10 = 1.02861e−08
6th surface K = −0.395
A4 = 2.07144e−04, A6 = −7.90379e−06, A8 = 5.78208e−07
9th surface K = −0.674
A4 = −7.57817e−04, A6 = 5.60996e−05
10th surface K = 0.000
A4 = −1.40025e−04, A6 = 3.26707e−05, A8 = 7.86476e−07
12th surface K = 0.000
A4 = 6.27334e−04, A6 = −1.10246e−05
14th surface K = 0.000
A4 = 9.38294e−04, A6 = −1.85385e−05, A8 = 4.66428e−07

Zoom data

|  | WE | ST | TE |
|---|---|---|---|
| Image height | 3.84 | 3.84 | 3.84 |
| Focal length | 4.10 | 11.20 | 23.70 |
| Fno. | 2.52 | 4.03 | 6.73 |
| Angle of field 2ω | 98.51 | 36.50 | 18.18 |
| BF (in air) | 5.16 | 4.50 | 1.56 |
| Lens total length (in air) | 37.23 | 32.13 | 35.81 |
| d4 | 16.99 | 4.31 | 0.50 |
| d10 | 1.74 | 5.82 | 12.81 |
| d12 | 2.48 | 6.64 | 10.09 |
| d14 | 3.77 | 3.10 | 0.16 |

Unit focal length

| f1 = −10.21 | f2 = 9.21 | f3 = −25.58 | f4 = 14.92 |
|---|---|---|---|

EXAMPLE 6

Unit mm

Surface data

| Surface no. | r | d | nd | vd |
|---|---|---|---|---|
| Object plane | ∞ | ∞ | | |
| 1* | −61.884 | 0.30 | 1.74320 | 49.34 |
| 2* | 5.098 | 1.35 | | |
| 3* | 10.332 | 2.34 | 1.63493 | 23.90 |
| 4* | 88.836 | Variable | | |
| 5 (Stop) | ∞ | 0.10 | | |
| 6* | 4.443 | 2.00 | 1.74320 | 49.34 |
| 7 | 86.345 | 0.30 | 1.68893 | 31.07 |
| 8 | 3.982 | 0.50 | | |
| 9* | 7.527 | 1.80 | 1.49700 | 81.54 |
| 10* | −17.569 | Variable | | |
| 11 | 40.000 | 0.50 | 1.53071 | 55.69 |
| 12* | 16.400 | Variable | | |
| 13 | −30.000 | 1.80 | 1.53071 | 55.69 |
| 14* | −6.630 | Variable | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 9.67976e−05, A6 = −6.98409e−06, A8 = 1.04787e−07,
A10 = −5.43550e−10
2nd surface K = −0.741
A4 = 5.51962e−04, A6 = −1.61587e−05, A8 = −5.49850e−09
3td surface K = 0.000
A4 = 4.24502e−04
4th surface K = 0.000
A4 = −6.01998e−05, A6 = 2.02543e−06, A8 = −1.93632e−07,
A10 = 4.96129e−09
6th surface K = −0.421
A4 = 1.62187e−04, A6 = −9.67061e−06, A8 = 1.03945e−06
9th surface K = 0.500
A4 = −3.51518e−04, A6 = 1.18876e−04
10th surface K = 0.000
A4 = 5.29905e−04, A6 = 8.55582e−05, A8 = 5.19543e−06
12th surface K = 0.000
A4 = 6.18582e−04, A6 = −1.15140e−06
14th surface K = 0.000
A4 = 9.88417e−04, A6 = −2.61011e−05, A8 = 6.83952e−07

Zoom data

|  | WE | ST | TE |
|---|---|---|---|
| Image height | 3.84 | 3.84 | 3.84 |
| Focal length | 3.96 | 10.81 | 22.89 |
| Fno. | 2.44 | 3.92 | 6.64 |
| Angle of field 2ω | 100.76 | 37.91 | 18.85 |
| BF (in air) | 5.43 | 4.25 | 1.50 |
| Lens total length (in air) | 37.22 | 31.71 | 37.23 |
| d4 | 17.31 | 4.24 | 0.50 |
| d10 | 1.50 | 8.95 | 18.26 |
| d12 | 2.00 | 3.28 | 5.98 |
| d14 | 4.03 | 2.85 | 0.10 |

Unit focal length

| f1 = −10.76 | f2 = 9.88 | f3 = −52.76 | f4 = 15.62 |
|---|---|---|---|

FIG. 7A, FIG. 7B, FIG. 7C, and FIG. 7D show a spherical aberration (SA), an astigmatism (AS), a distortion (DT), and a chromatic aberration of magnification (CC) respectively, at the wide angle end of the first example.

FIG. 7E, FIG. 7F, FIG. 7G, and FIG. 7H show a spherical aberration (SA), an astigmatism (AS), a distortion (DT), and a chromatic aberration of magnification (CC) respectively, at the intermediate focal length state of the first example.

FIG. 7I, FIG. 7J, FIG. 7K, and FIG. 7L show a spherical aberration (SA), an astigmatism (AS), a distortion (DT), and a chromatic aberration of magnification (CC) respectively, at the telephoto end of the first example.

FIG. 8A, FIG. 8B, FIG. 8C, and FIG. 8D show a spherical aberration (SA), an astigmatism (AS), a distortion (DT), and a chromatic aberration of magnification (CC) respectively, at the wide angle end of the second example.

FIG. 8E, FIG. 8F, FIG. 8G, and FIG. 8H show a spherical aberration (SA), an astigmatism (AS), a distortion (DT), and a chromatic aberration of magnification (CC) respectively, at the intermediate focal length state of the second example.

FIG. 8I, FIG. 8J, FIG. 8K, and FIG. 8L show a spherical aberration (SA), an astigmatism (AS), a distortion (DT), and a chromatic aberration of magnification (CC) respectively, at the telephoto end of the second example.

FIG. 9A, FIG. 9B, FIG. 9C, and FIG. 9D show a spherical aberration (SA), an astigmatism (AS), a distortion (DT), and a chromatic aberration of magnification (CC) respectively, at the wide angle end of the third example.

FIG. 9E, FIG. 9F, FIG. 9G, and FIG. 9H show a spherical aberration (SA), an astigmatism (AS), a distortion (DT), and a chromatic aberration of magnification (CC) respectively, at the intermediate focal length state of the third example.

FIG. 9I, FIG. 9J, FIG. 9K, and FIG. 9L show a spherical aberration (SA), an astigmatism (AS), a distortion (DT), and a chromatic aberration of magnification (CC) respectively, at the telephoto end of the third example.

FIG. 10A, FIG. 10B, FIG. 10C, and FIG. 10D show a spherical aberration (SA), an astigmatism (AS), a distortion (DT), and a chromatic aberration of magnification (CC) respectively, at the wide angle end of the fourth example.

FIG. 10E, FIG. 10F, FIG. 10G, and FIG. 10H show a spherical aberration (SA), an astigmatism (AS), a distortion (DT), and a chromatic aberration of magnification (CC) respectively, at the intermediate focal length state of the fourth example.

FIG. 10I, FIG. 10J, FIG. 10K, and FIG. 10L show a spherical aberration (SA), an astigmatism (AS), a distortion (DT), and a chromatic aberration of magnification (CC) respectively, at the telephoto end of the fourth example.

FIG. 11A, FIG. 11B, FIG. 11C, and FIG. 11D show a spherical aberration (SA), an astigmatism (AS), a distortion (DT), and a chromatic aberration of magnification (CC) respectively, at the wide angle end of the fifth example.

FIG. 11E, FIG. 11F, FIG. 11G, and FIG. 11H show a spherical aberration (SA), an astigmatism (AS), a distortion (DT), and a chromatic aberration of magnification (CC) respectively, at the intermediate focal length state of the fifth example.

FIG. 11I, FIG. 11J, FIG. 11K, and FIG. 11L show a spherical aberration (SA), an astigmatism (AS), a distortion (DT), and a chromatic aberration of magnification (CC) respectively, at the telephoto end of the fifth example.

FIG. 12A, FIG. 12B, FIG. 12C, and FIG. 12D show a spherical aberration (SA), an astigmatism (AS), a distortion (DT), and a chromatic aberration of magnification (CC) respectively, at the wide angle end of the sixth example.

FIG. 12E, FIG. 12F, FIG. 12G, and FIG. 12H show a spherical aberration (SA), an astigmatism (AS), a distortion (DT), and a chromatic aberration of magnification (CC) respectively, at the intermediate focal length state of the sixth example.

FIG. 12I, FIG. 12J, FIG. 12K, and FIG. 12L show a spherical aberration (SA), an astigmatism (AS), a distortion (DT), and a chromatic aberration of magnification (CC) respectively, at the telephoto end of the sixth example.

In each diagram, 'FIY' denotes a maximum image height.

Subsequently, set out below are the values of conditional expressions in each example.

| Conditional expression | Example 1 | Example 2 | Example 3 |
|---|---|---|---|
| (1) ft/fw | 5.78 | 7.68 | 5.75 |
| (2) Δ2G (w − t)/dt | 0.45 | 0.47 | 0.44 |
| (3) Δ3G (w − t)/Δ2G (w − t) | 0.45 | 0.59 | 0.45 |
| (4) \|φ3/φ4\| | 0.97 | 1.06 | 0.97 |
| (5) \|f3\|/fw | 4.08 | 3.36 | 4.05 |
| (6) Σd2G/y | 1.07 | 1.20 | 1.07 |
| (7) dt/y | 9.75 | 11.13 | 9.82 |
| (8) fw/y | 1.12 | 1.06 | 1.14 |

| Conditional expression | Example 4 | Example 5 | Example 6 |
|---|---|---|---|
| (1) ft/fw | 5.78 | 5.78 | 5.78 |
| (2) Δ2G (w − t)/dt | 0.43 | 0.42 | 0.45 |
| (3) Δ3G (w − t)/Δ2G (w − t) | 0.40 | 0.27 | 0.003 |
| (4) \|φ3/φ4\| | 0.67 | 0.58 | 0.30 |
| (5) \|f3\|/fw | 5.51 | 6.24 | 13.32 |
| (6) Σd2G/y | 1.11 | 1.23 | 1.20 |
| (7) dt/y | 9.05 | 9.32 | 9.69 |
| (8) fw/y | 1.04 | 1.07 | 1.03 |

(Correction of Distortion)

Incidentally, when the zoom lens system of the present invention is used, a digital correction of distortion of an image is carried out electrically. Therefore, by reducing an image height IH at the wide angle end, the effective image pickup area is let to be barrel shaped at the wide angle end.

A basic concept for the digital correction of the distortion of an image will be described below.

Figure 13:
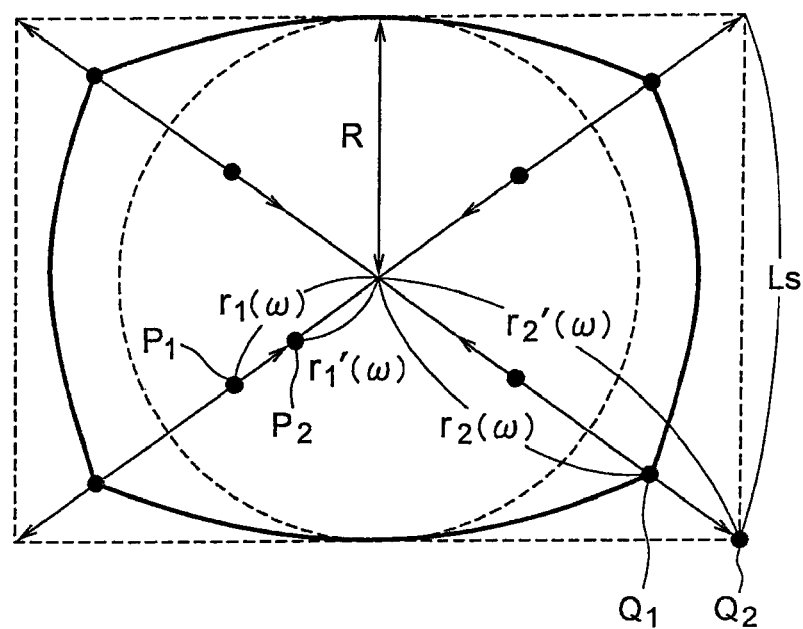
FIG. 13 is a diagram describing a correction of distortion.

For example, as shown in FIG. 13, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 13, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \cdot \tan\omega \, (0 \leq \alpha \leq 1)$$

where, ω is a half angle of field of an object, f is a focal length of an imaging optical system (the zoom lens system in the present invention), and α is no fewer than 0, nor more than 1.

Here, when an ideal image height corresponding to a circle (image height) of radius R is let to be Y, then $$\alpha = R/Y = R/(f \cdot \tan\omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial image quality, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 14:
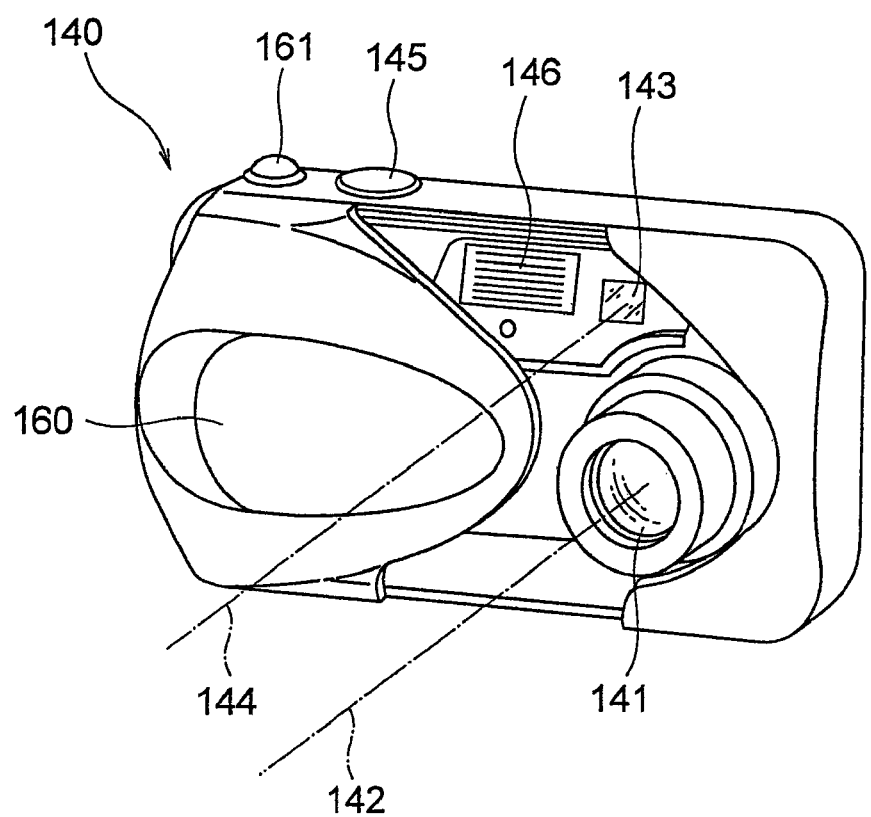
FIG. 14 is a front perspective view showing an appearance of a digital camera in which, the zoom lens according to the present invention is incorporated.
Figure 15:
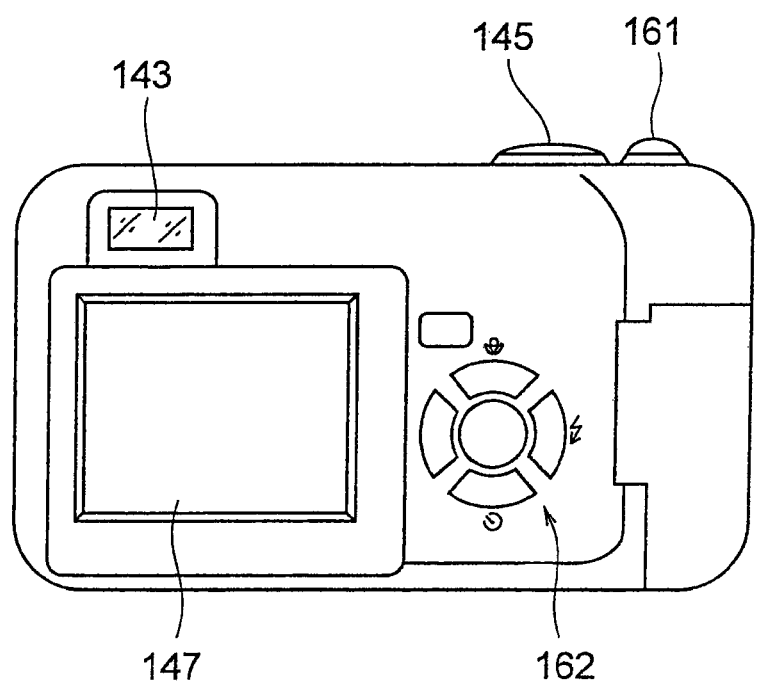
FIG. 15 is a rear perspective view of the digital camera in FIG. 14.
Figure 16:
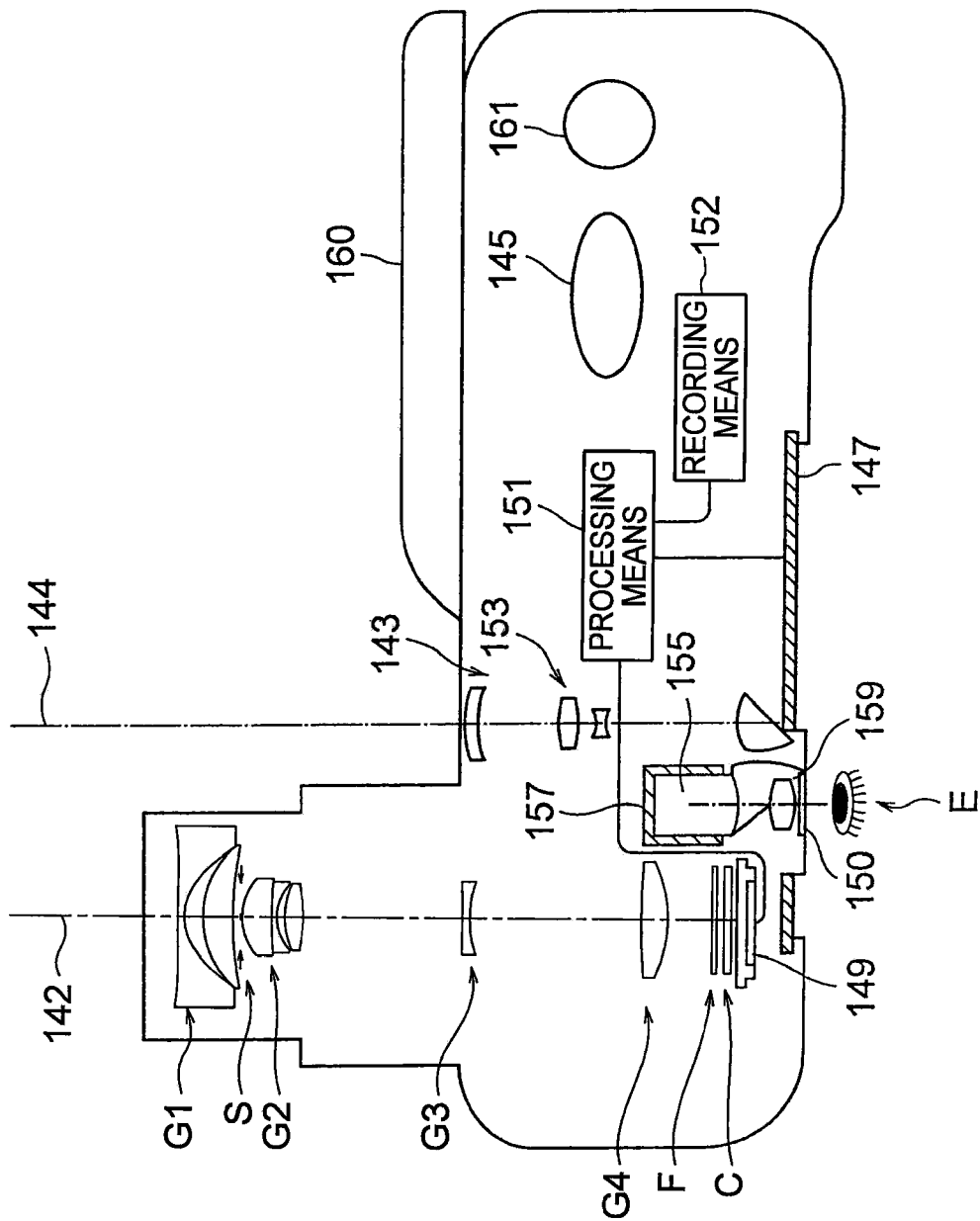
FIG. 16 is a cross-sectional view of the digital camera in FIG. 14.

FIG. 14 to FIG. 16 are conceptual diagrams of a structure of a digital camera according to the present invention in which a zoom lens system described above is incorporated in a taking optical system 141. FIG. 14 is a front perspective view showing an appearance of a digital camera 140, FIG. 15 is a rear view of the same, and FIG. 16 is a schematic cross-sectional view showing a structure of the digital camera 140. In FIG. 14 and FIG. 16, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 14, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

Moreover, an arrangement may be made such that the zoom lens is detachable from a camera main-body which holds an image pickup element, and the zoom lens may be structured as an interchangeable lens. Nowadays, apart from a single-lens reflex camera which includes a quick-return mirror inside the camera main-body, an interchangeable lens camera in which the quick-return mirror is eliminated is becoming popular. However, in the zoom lens according to each of the embodiments, since back focus is moderately short, it is preferable to use the zoom lens according to each of the embodiments as an interchangeable lens of a camera without the quick-return mirror.

(Internal Circuit Structure)

Figure 17:
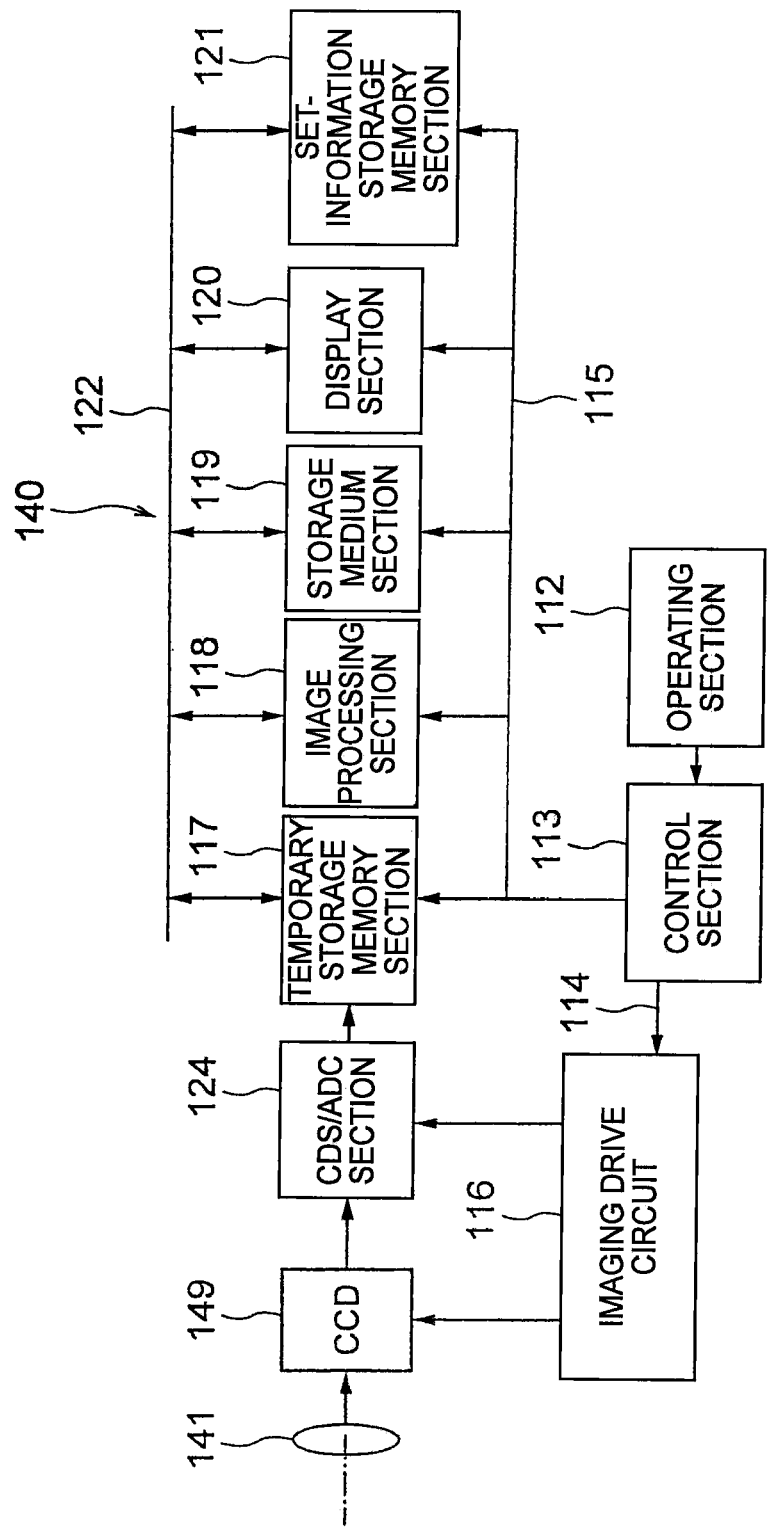
FIG. 17 is a structural block diagram of an internal circuit of main components of a digital camera.

FIG. 17 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 17, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (Bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the zoom lens according to the present invention, while having a high zooming ratio at the wide angle of view, is useful for an optical system which corrects various aberrations favorably, and is particularly suitable for an optical system of an image pickup apparatus which includes an electronic image pickup element such as a CCD or a CMOS.

According to the present invention, it is possible to provide a zoom lens which is thin, and in which various aberrations are corrected favorably while having a high zooming ratio at the wide angle of view, and an image pickup apparatus in which, such zoom lens is used.

What is claimed is:

1. A zoom lens comprising in order from an object side:
a first lens unit having a negative refractive power;
a second lens unit having a positive refractive power;
a third lens unit having a negative refractive power; and
a fourth lens unit having a positive refractive power, wherein
the second lens unit comprises in order from the object side
a positive lens element,
a negative lens element, and
a positive lens element, and
at the time of zooming from a wide angle end to a telephoto end
the third lens unit moves toward the object side, and the fourth lens unit moves, and
a distance between the first lens unit and the second lens unit decreases monotonically, and
a distance between the second lens unit and the third lens unit increases monotonically, and
a distance between the third lens unit and the fourth lens unit increases monotonically.

2. The zoom lens according to claim 1, wherein the zoom lens satisfies the following conditional expression (2)

$$0.33 \leq \Delta 2G(w-t)/dt \leq 0.6 \tag{2}$$

where,
$\Delta 2G(w-t)$ denotes an amount of movement of the second lens unit from the wide angle end to the telephoto end, and
dt denotes an overall length of the zoom lens at the telephoto end.

3. The zoom lens according to claim 2, wherein the zoom lens satisfies the following conditional expression (3)

$$0 < \Delta 3G(w-t)/\Delta 2G(w-t) \leq 0.7 \tag{3}$$

where,
$\Delta 3G(w-t)$ denotes an amount of movement of the third lens unit from the wide angle end to the telephoto end, and
$\Delta 2G(w-t)$ denotes the amount of movement of the second lens unit from the wide angle end to the telephoto end.

4. The zoom lens according to claim 1, wherein the zoom lens satisfies the following conditional expression (4)

$$0.1 \leq |\phi_3/\phi_4| \leq 1.5 \tag{4}$$

where,
$\phi_3$ denotes a refractive power of the third lens unit, and
$\phi_4$ denotes a refractive power of the fourth lens unit.

5. The zoom lens according to claim 1, wherein
the third lens unit consists one lens element, and
the zoom lens satisfies the following conditional expression (5)

$$3.0 \leq |f3|/fw \leq 13.5 \tag{5}$$

where,
f3 denotes a focal length of the third lens unit, and
fw denotes a focal length of the overall zoom lens at the wide angle end.

6. The zoom lens according to claim 1, wherein the zoom lens satisfies the following conditional expression (6)

$$\Sigma d2G/y \leq 1.5 \tag{6}$$

where,
$\Sigma d2G$ denotes a distance between a lens surface nearest to the object side in the second lens unit and a lens surface nearest to an image side in the second lens unit, which is also a distance of the longest line segment from among line segments which are drawn in a direction parallel to an optical axis of each of a position on the optical axis and a position on a virtual line, and
y denotes the maximum image height on an image forming surface in the zoom lens.

7. The zoom lens according to claim 1, wherein the zoom lens satisfies the following conditional expression (6)

$$\Sigma d2G/y \leq 1.5 \tag{6}$$

where,
$\Sigma d2G$ denotes a distance between a lens surface nearest to the object side in the second lens unit and a lens surface nearest to an image side in the second lens unit, which is also a distance of the longest line segments from among line segments which are drawn in a direction parallel to an optical axis of each of a position on the optical axis and a position on a virtual line, and
y denotes the maximum image height on an image forming surface in the zoom lens.

8. The zoom lens according to claim 1, wherein the zoom lens satisfies the following conditional expression (7)

$$8.0 \leq dt/y \leq 12 \tag{7}$$

where,
dt denotes an overall length of the zoom lens at the telephoto end, and
y denotes the maximum image height on an image forming surface in the zoom lens.

9. The zoom lens according to claim 1, wherein
the second lens unit comprises a lens nearest to the object side and a lens nearest to an image side, and
a surface on the object side of the lens nearest to the object side has a convex shape, and
a surface on the image side of the lens nearest to the image side has a convex shape.

10. The zoom lens according to claim 1, wherein
the first lens unit consist two lens elements,
the third lens unit consist one lens element, and
the fourth lens unit consist one lens element.

11. The zoom lens according to claim 1, wherein the zoom lens satisfies the following conditional expression (8)

$$fw/y \leq 1.3 \tag{8}$$

where,
y denotes the maximum image height on an image forming lens in the zoom lens, and
fw denotes a focal length of the overall zoom lens at the wide angle end.

12. An image pickup apparatus comprising:
a zoom lens according to claim 1; and
an image pickup element having an image pickup surface which converts an optical image to an electric signal.

13. A zoom lens comprising in order from an object side:
a first lens unit having a negative refractive power;
a second lens unit having a positive refractive power;
a third lens unit having a negative refractive power; and
a fourth lens unit having a positive refractive power, wherein
the second lens unit comprises in order from the object side
a positive lens element,
a negative lens element, and
a positive lens element, and
the zoom lens satisfies the following conditional expression (1)

$$ft/fw \geq 5 \quad (1)$$

where,
ft denotes a focal length of the overall zoom lens system at a telephoto end, and
fw denotes a focal length of the overall zoom lens system at a wide angle end.

14. The zoom lens according to claim 13, wherein the zoom lens satisfies the following conditional expression (2)

$$0.33 \leq \Delta 2G(w-t)/dt \leq 0.6 \quad (2)$$

where,
Δ2G(w−t) denotes an amount of movement of the second lens unit from the wide angle end to the telephoto end, and
dt denotes an overall length of the zoom lens at the telephoto end.

15. The zoom lens according to claim 14, wherein the zoom lens satisfies the following conditional expression (3)

$$0 < \Delta 3G(w-t)/\Delta 2G(w-t) \leq 0.7 \quad (3)$$

where,
Δ3G(w−t) denotes an amount of movement of the third lens unit from the wide angle end to the telephoto end, and
Δ2G(w−t) denotes an amount of movement of the second lens unit from the wide angle end to the telephoto end.

16. The zoom lens according to claim 13, wherein the zoom lens satisfies the following conditional expression (4)

$$0.1 \leq |\phi_3/\phi_4| \leq 1.5 \quad (4)$$

where,
$\phi_3$ denotes a refractive power of the third lens unit, and
$\phi_4$ denotes a refractive power of the fourth lens unit.

17. The zoom lens according to claim 13, wherein
the third lens unit consist one lens, and
the zoom lens satisfies the following conditional expression (5)

$$3.0 \leq |f3|/fw \leq 13.5 \quad (5)$$

where,
f3 denotes a focal length of the third lens unit, and
fw denotes a focal length of the overall zoom lens at the wide angle end.

18. The zoom lens according to claim 13, wherein the zoom lens satisfies the following conditional expression (7)

$$8.0 \leq dt/y \leq 12 \quad (7)$$

where,
dt denotes an overall length of the zoom lens at the telephoto end, and
y denotes the maximum image height on an image forming surface in the zoom lens.

19. The zoom lens according to claim 13, wherein
the second lens unit comprises a lens nearest to the object side and a lens nearest to an image side, and
a surface on the object side of the lens nearest to the object side has a convex shape, and
a surface on the image side of the lens nearest to the image side has a convex shape.

20. The zoom lens according to claim 13, wherein
the first lens unit consist two lens elements,
the third lens unit consist one lens element, and
the fourth lens unit consist one lens element.

21. The zoom lens according to claim 13, wherein the zoom lens satisfies the following conditional expression (8)

$$fw/y \leq 1.3 \quad (8)$$

where,
y denotes the maximum image height on an image forming lens in the zoom lens, and
fw denotes the focal length of the overall zoom lens at the wide angle end.

22. An image pickup apparatus comprising:
a zoom lens according to claim 13; and
an image pickup element having an image pickup surface which converts an optical image to an electric signal.

* * * * *